United States Patent
Agrawal et al.

(10) Patent No.: US 11,983,934 B2
(45) Date of Patent: May 14, 2024

(54) MACHINE-LEARNED OBSTRUCTION DETECTION IN A FARMING MACHINE

(71) Applicant: Blue River Technology Inc., Sunnyvale, CA (US)

(72) Inventors: Rahul Agrawal, Santa Clara, CA (US); Rajesh Radhakrishnan, Mountain View, CA (US); Brent William West, Redwood City, CA (US)

(73) Assignee: BLUE RIVER TECHNOLOGY INC., Santa Clara, CA (US)

( * ) Notice: Subject to any disclaimer, the term of this patent is extended or adjusted under 35 U.S.C. 154(b) by 316 days.

(21) Appl. No.: 17/562,919

(22) Filed: Dec. 27, 2021

(65) Prior Publication Data

US 2022/0207881 A1 Jun. 30, 2022

Related U.S. Application Data

(60) Provisional application No. 63/131,296, filed on Dec. 28, 2020.

(51) Int. Cl.
  *G06V 20/58* (2022.01)
  *G05D 1/00* (2006.01)
  (Continued)

(52) U.S. Cl.
  CPC .......... *G06V 20/58* (2022.01); *G05D 1/0214* (2013.01); *G06V 10/70* (2022.01); *G06V 20/70* (2022.01); *G06V 40/25* (2022.01); *G06V 40/28* (2022.01)

(58) Field of Classification Search
  CPC ........ G06V 10/70; G06V 20/58; G06V 20/70; G06V 40/25; G06V 40/28; G05D 1/0221;
  (Continued)

(56) References Cited

U.S. PATENT DOCUMENTS 10,713,484 B2 7/2020 Polzounov et al.
11,093,745 B2 8/2021 Redden et al.
(Continued)

OTHER PUBLICATIONS

Manderson, Travis, Juan Camilo Gamboa Higuera, Stefan Wapnick, Jean-François Tremblay, Florian Shkurti, David Meger, and Gregory Dudek. "Vision-based goal-conditioned policies for underwater navigation in the presence of obstacles." arXiv preprint arXiv:2006.16235 (2020). (Year: 2020).*

(Continued)

*Primary Examiner* — Carol Wang
(74) *Attorney, Agent, or Firm* — Fenwick & West LLP

(57) ABSTRACT

A control system of a farming machine is configured to identify obstruction in a field from image data of the field. The control system accesses an obstruction model configured to identify obstructions in a field from image data of the field. The obstruction model is generated by accessing image data of obstructions in a training field, each obstruction corresponding to a prescribed action occurring at a prescribed time, labelling the image data of the obstructions, and training the obstruction model based on the labelled image data. The control system captures image data of the field including an obstruction and inputs the image data into the obstruction model. Responsive to identifying the obstruction in the field, the control system modifies treatment instructions of the farming machine such that the farming machine performs a implements a farming objective while avoiding the obstruction in the field.

20 Claims, 12 Drawing Sheets

(51) Int. Cl.
*G06V 10/70* (2022.01)
*G06V 20/70* (2022.01)
*G06V 40/20* (2022.01)

(58) Field of Classification Search
CPC .............. G05D 1/0246; G05D 1/0214; G05D 2201/0201
See application file for complete search history.

(56) References Cited

U.S. PATENT DOCUMENTS

| | | | |
|---|---|---|---|
| 2018/0330166 A1* | 11/2018 | Redden | G06V 20/188 |
| 2019/0146511 A1 | 5/2019 | Hurd et al. | |
| 2019/0205667 A1* | 7/2019 | Avidan | G08G 1/165 |
| 2020/0159220 A1* | 5/2020 | Hurd | G06Q 50/02 |
| 2021/0357664 A1* | 11/2021 | Kocer | B64C 39/024 |
| 2022/0230444 A1* | 7/2022 | Edo | A01B 69/001 |

OTHER PUBLICATIONS

PCT International Search Report and Written Opinion, PCT Application No. PCT/US21/65250, dated Mar. 15, 2022, 14 pages.
U.S. Appl. No. 17/033,318, filed Sep. 25, 2020, Inventors Chia-Chun Fu, Christopher Grant Padwick, James Patrick Ostrowski, and Kent Anderson (copy not enclosed).

* cited by examiner

MACHINE-LEARNED OBSTRUCTION DETECTION IN A FARMING MACHINE

CROSS-REFERENCE TO RELATED APPLICATION

This application claims the benefit of U.S. Provisional Application No. 63/131,296 filed Dec. 28, 2020 the contents of which are hereby incorporated in reference in their entirety.

BACKGROUND

Field of Disclosure

This disclosure relates to using an obstruction model to identify obstructions in a field, and, more specifically, using an obstruction model trained on images corresponding to prescribed actions.

Description of the Related Art

Historically, operators of farming machines in a field use data gathered by sensors on the farming machine to inform how they control the farming machine complete farming objectives in a field. For example, an operator may view image data to determine whether there are obstructions around the farming machine in the field and drives the farming machine around those obstructions. However, as the operator drives the farming machine through the field, the farming machine may encounter a diverse variety of obstructions, such as large rocks, bales of hay, and workers on the farm. Though an operator may recognize one or more of these obstructions (e.g., the workers doing activities such as walking or crouching), many current farming machines will not. As such, farming machines need to be able to recognize these obstructions on their own as autonomous solutions become available for completing farming objectives. If an autonomous farming machine cannot recognize a range of obstructions based on sensor data, the farming machine may be unable to avoid dangerous encounters with such obstructions, resulting in an unsafe working environment and potential damage to the farming machine and other farming equipment.

Traditionally, for a farming machine to detect obstructions, the farming machine may employ a plurality of models to determine how to navigate around obstructions in the field to achieve the farming objectives. Within this schema, each model requires a data set containing many examples of obstacles in various environment types for training and testing. However, because farming machines may encounter a multitude of unique obstructions in a field, and the relative frequency at which each type of obstruction is seen in the field is low, gathering images of obstructions to train such models with may be a slow and cumbersome process. Once images of various obstructions have been captured, the images need to be manually labelled in order to train one or more models, which takes additional time and man-power to complete. Therefore, a more efficient way of capturing data for training models to identify unique obstructions would be beneficial.

Unique obstacle detection problems are near ubiquitous across autonomous navigation platforms. For example, in construction, human operators of machines have historically needed to detect obstructions using their own visibility while operating the machines or with only limited aids. Eventually, operators were able to use passive aids (e.g., mirrors on the machine) or active aids (e.g., camera at the back of the machine) to identify obstructions in a construction site and determine how to move machines in the construction site. Nevertheless, operators may still experience challenges when moving the machine, even with the help of such aids. Examples may include blind spots, lack of operation skills, mental fatigue and lack of focus. Thus, a system for reliably detecting obstructions in a construction site, including obstructions that may not commonly occur, is necessary.

SUMMARY

A farming machine is described which includes one or more sensors for capturing image data as the farming machine moves through a field. The image data includes visual information representing objects in the field, including obstructions that may prevent the farming machine from traversing portions of the field. The farming machine includes a control system, and the control system applies an obstruction identification module to image data to identify obstructions in the field. The image data is captured in a training field and include obstructions that correspond to prescribed actions occurring at specific times. The obstruction identification module may be a convolutional neural network trained using the image data of obstructions labelled with the prescribed actions and the specific times.

As the farming machine traverses a field to fulfill a farming objective, such as treating plants, the control system receives image data captured of the field and accesses objective instructions for the farming objective. The control system inputs the image data into the obstruction identification module to identify obstructions in the field. Responsive to identifying an obstruction, the control system may modify the objective instructions so the farming machine avoids the obstruction as it traverses the field.

Figure 1A:
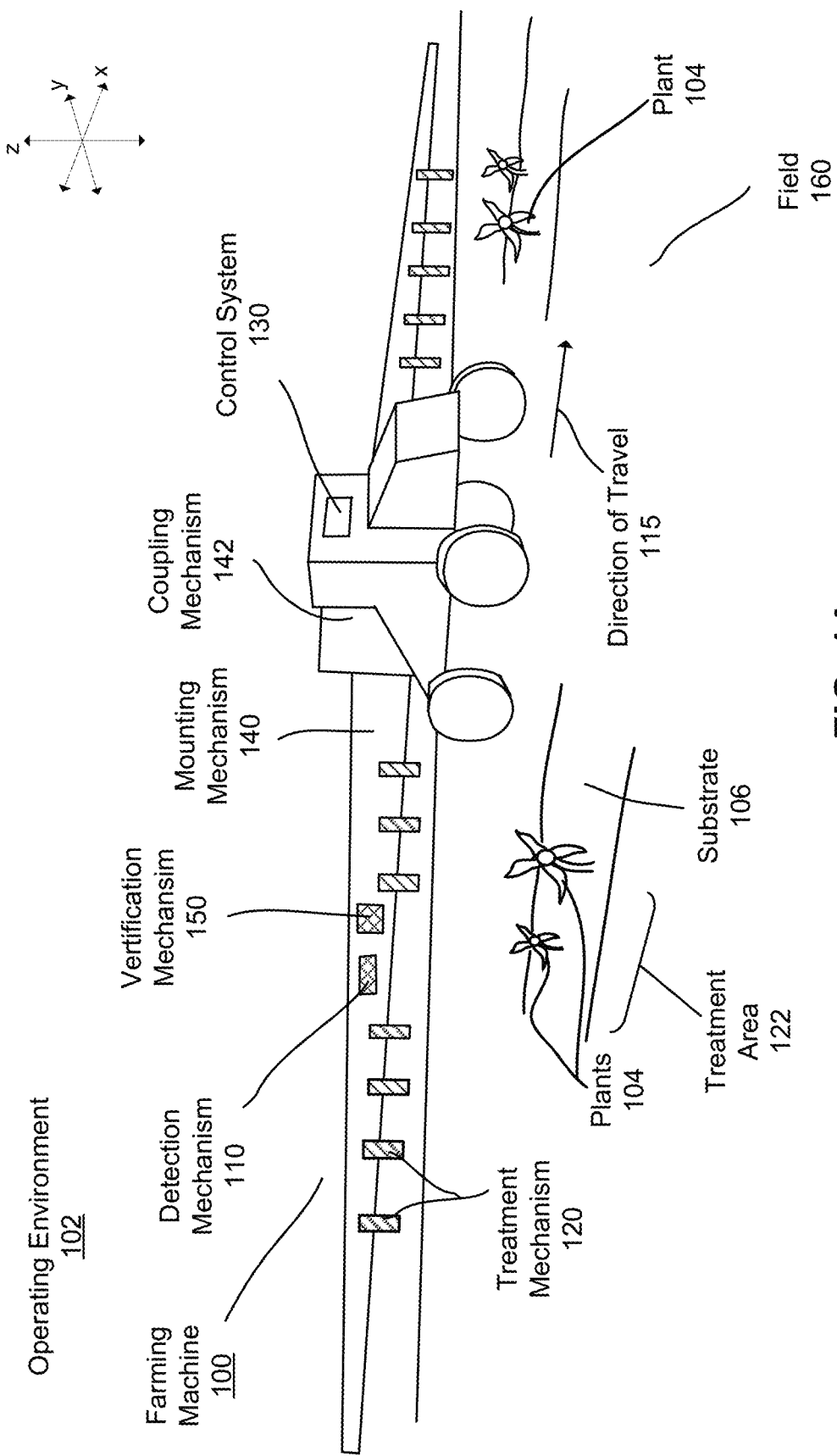
FIG. 1A is an isometric view of a farming machine 100 that performs farming actions of a treatment plan, according to one example embodiment.

The figures depict various embodiments for purposes of illustration only. One skilled in the art will readily recognize from the following discussion that alternative embodiments of the structures and methods illustrated herein may be employed without departing from the principles described herein.

DETAILED DESCRIPTION

I. Introduction

A farming machine includes one or more sensors capturing information about a field environment, such as crops, weeds, obstructions, and ground conditions, as the farming machine moves through a field. The farming machine includes a control system that processes the information obtained by the sensors to identify obstructions in the field and modify instructions for completing farming objectives based on the identified obstructions. In some examples, the treatment instructions may be for treating a plant, tilling a field, or navigating the field to perform various other farming actions. The control system employs one or more machine learning models to identify obstructions. The machine learning models are trained on image data captured of prescribed actions occurring at specific times in a field.

Generally, a farming machine may only encounter a finite number of common obstructions as it traverses a field. Examples of these common obstructions may include rocks, workers, farm animals, buildings, and the like. By training a machine learning model to identify obstructions based on this image data, a farming machine may navigate the field to avoid dangerous scenarios (e.g., running into a building or cow). However, a field may contain numerous other types of obstructions that a farming machine needs to properly identify to safely traverse a field. Such obstructions may be uncommon, and if the image data used for training the machine learning model does not include these uncommon obstructions, the farming machine may be unable to recognize the uncommon obstructions and navigate around them. To improve the robustness of the farming machine's obstruction recognition capabilities, as here, a machine learning model is trained using image data of both common and uncommon obstructions that arise in a field. With this trained machine learning model, the farming machine may be able to recognize and navigate around uncommon obstructions, increasing safety for an operator of the farming machine and workers in the field.

Furthermore, constructions machines may face similar obstruction-detection issues as farming machines. For instance, construction machines have been historically piloted by human operators with limited aids for visibility and situational awareness. Such aids may include passive (e.g., mirrors on or around the construction machine) or active aids (e.g. cameras on the machine that stream video to the operators or back up cameras that employ basic object detection to detect unknown objects). Because of operation limitations, such as blind spots, unskilled operators, and on operator fatigue, operators have trouble reliably spotting relevant obstructions.

To further improve operators' ability to avoid obstructions in construction environments, a system that augments operators' perception abilities by alerting the operators to the presence of obstructions is needed. However, building and testing these systems to can learn to "see" obstacles requires a large amount of data describing example obstructions. Like in a field for farming, a construction environment has a large plurality of potential obstructions in a variety of positions/locations/scenarios. Further, some obstructions may be only rarely seen during normal operation of a constructions machine in a construction environment, especially seeing these obstacles. Thus, a system for scripting of data collection with actors is needed to augment data collection that occurs during normal construction machine operation.

Described herein is a farming machine that identifies obstructions in a field while traversing the field to fulfill a farming objective. The farming machine uses one or more machine learning models trained on image data of obstructions in a training field. The image data may include visual information such as, for example, color information encoded as pixels in an image (e.g., three channels in an RGB image), or some other visual information. Though the following description is described in relation to image data, in some instances, other types of sensor data may be additionally employed by the farming machine to identify obstructions. Examples of other types of sensor data include LiDAR or radar data captured by the sensors on the farming machine.

The image sensors of the farming machine are configured to capture images of plants and other objects in a field as the farming machine traverses the field to complete a farming objective. The farming machine may access treatment instructions for the farming objective based on the image data and inputs the image data into an obstruction identification model, which is configured to identify objects in the field from the image data. Alternatively, the farming machine may access other instructions for completing one or more farming objectives, such as for tilling. The obstruction identification model is trained on image data of obstructions in a training field. The image data is captured at a prior time with actors in the training field completing prescribed actions at specific locations and specific times, which may be relayed to actors by an operator following instructions from a user interface. Subsequently, once the operator indicates to capture image data of the actors via the user interface, the image data is automatically labelled with each prescribed action based on the specific location of the prescribed action relative to the farming machine and the specific time at which each prescribed action occurred.

If the farming machine identifies an obstruction using the obstruction identification model, the farming machine may modify the treatment instructions to avoid the obstruction while traversing the field, such as by stopping or turning the farming machine 100. In some embodiments, the farming machine may actuate a treatment mechanism, modify an operating parameter, modify a treatment parameter, and/or modify a sensor parameter when modifying the treatment instructions. Other modifications are also possible.

Though labeled as a "farming machine" throughout the following description, the farming machine may be any machine that employs an obstruction identification module. For instance, a construction machine may employ the obstruction identification to detect obstructions and modify construction instructions the construction machine is following in a construction environment. Obstruction identification with a construction machine is described in relation to FIG. 8.

II. Field Management and Treatment Plans

Field Management

Agricultural managers ("managers") are responsible for managing farming operations in one or more fields. Managers work to implement a farming objective within those fields and select from among a variety of farming actions to implement that farming objective. Traditionally, managers are, for example, a farmer or agronomist that works the field but could also be other people and/or systems configured to manage farming operations within the field. For example, a manager could be an automated farming machine, a machine learned computer model, etc. In some cases, a manager may be a combination of the managers described above. For example, a manager may include a farmer assisted by a machine learned agronomy model and one or more automated farming machines or could be a farmer and an agronomist working in tandem.

Managers implement one or more farming objectives for a field. A farming objective is typically a macro-level goal for a field. For example, macro-level farming objectives may include treating crops with growth promotors, neutralizing weeds with growth regulators, harvesting a crop with the best possible crop yield, or any other suitable farming objective. However, farming objectives may also be a micro-level goal for the field. For example, micro-level farming objectives may include treating a particular plant in the field, repairing or correcting a part of a farming machine, requesting feedback from a manager, etc. Of course, there are many possible farming objectives and combinations of farming objectives, and the previously described examples are not intended to be limiting.

Faming objectives are accomplished by one or more farming machines performing a series of farming actions. Farming machines are described in greater detail below. Farming actions are any operation implementable by a farming machine within the field that works towards a farming objective. Consider, for example, a farming objective of harvesting a crop with the best possible yield. This farming objective requires a litany of farming actions, e.g., planting the field, fertilizing the plants 104, watering the plants 104, weeding the field, harvesting the plants 104, evaluating yield, etc. Similarly, each farming action pertaining to harvesting the crop may be a farming objective in and of itself. For instance, planting the field can require its own set of farming actions, e.g., preparing the soil, digging in the soil, planting a seed, etc.

In other words, managers implement a treatment plan in the field to accomplish a farming objective. A treatment plan is a hierarchical set of macro-level and/or micro-level objectives that accomplish the farming objective of the manager. Within a treatment plan, each macro or micro-objective may require a set of farming actions to accomplish, or each macro or micro-objective may be a farming action itself. So, to expand, the treatment plan is a temporally sequenced set of farming actions to apply to the field that the manager expects will accomplish the faming objective.

When executing a treatment plan in a field, the treatment plan itself and/or its constituent farming objectives and farming actions have various results. A result is a representation as to whether, or how well, a farming machine accomplished the treatment plan, farming objective, and/or farming action. A result may be a qualitative measure such as "accomplished" or "not accomplished," or may be a quantitative measure such as "40 pounds harvested," or "1.25 acres treated." Results can also be positive or negative, depending on the configuration of the farming machine or the implementation of the treatment plan. Moreover, results can be measured by sensors of the farming machine, input by managers, or accessed from a datastore or a network.

Traditionally, managers have leveraged their experience, expertise, and technical knowledge when implementing farming actions in a treatment plan. In a first example, a manager may spot check weed pressure in several areas of the field to determine when a field is ready for weeding. In a second example, a manager may refer to previous implementations of a treatment plan to determine the best time to begin planting a field. Finally, in a third example, a manager may rely on established best practices in determining a specific set of farming actions to perform in a treatment plan to accomplish a farming objective.

Leveraging manager and historical knowledge to make decisions for a treatment plan affects both spatial and temporal characteristics of a treatment plan. For instance, farming actions in a treatment plan have historically been applied to entire field rather than small portions of a field. To illustrate, when a manager decides to plant a crop, she plants the entire field instead of just a corner of the field having the best planting conditions; or, when the manager decides to weed a field, she weeds the entire field rather than just a few rows. Similarly, each farming action in the sequence of farming actions of a treatment plan are historically performed at approximately the same time. For example, when a manager decides to fertilize a field, she fertilizes the field at approximately the same time; or, when the manager decides to harvest the field, she does so at approximately the same time.

Notably though, farming machines have greatly advanced in their capabilities. For example, farming machines continue to become more autonomous, include an increasing number of sensors and measurement devices, employ higher amounts of processing power and connectivity, and implement various machine vision algorithms to enable managers to successfully implement a treatment plan.

Because of this increase in capability, managers are no longer limited to spatially and temporally monolithic implementations of farming actions in a treatment plan. Instead, managers may leverage advanced capabilities of farming machines to implement treatment plans that are highly localized and determined by real-time measurements in the field. In other words, rather than a manager applying a "best guess" treatment plan to an entire field, they can implement individualized and informed treatment plans for each plant in the field.

II. Farming Machine

Overview

A farming machine that implements farming actions of a treatment plan may have a variety of configurations, some of which are described in greater detail below.

Figure 1B:
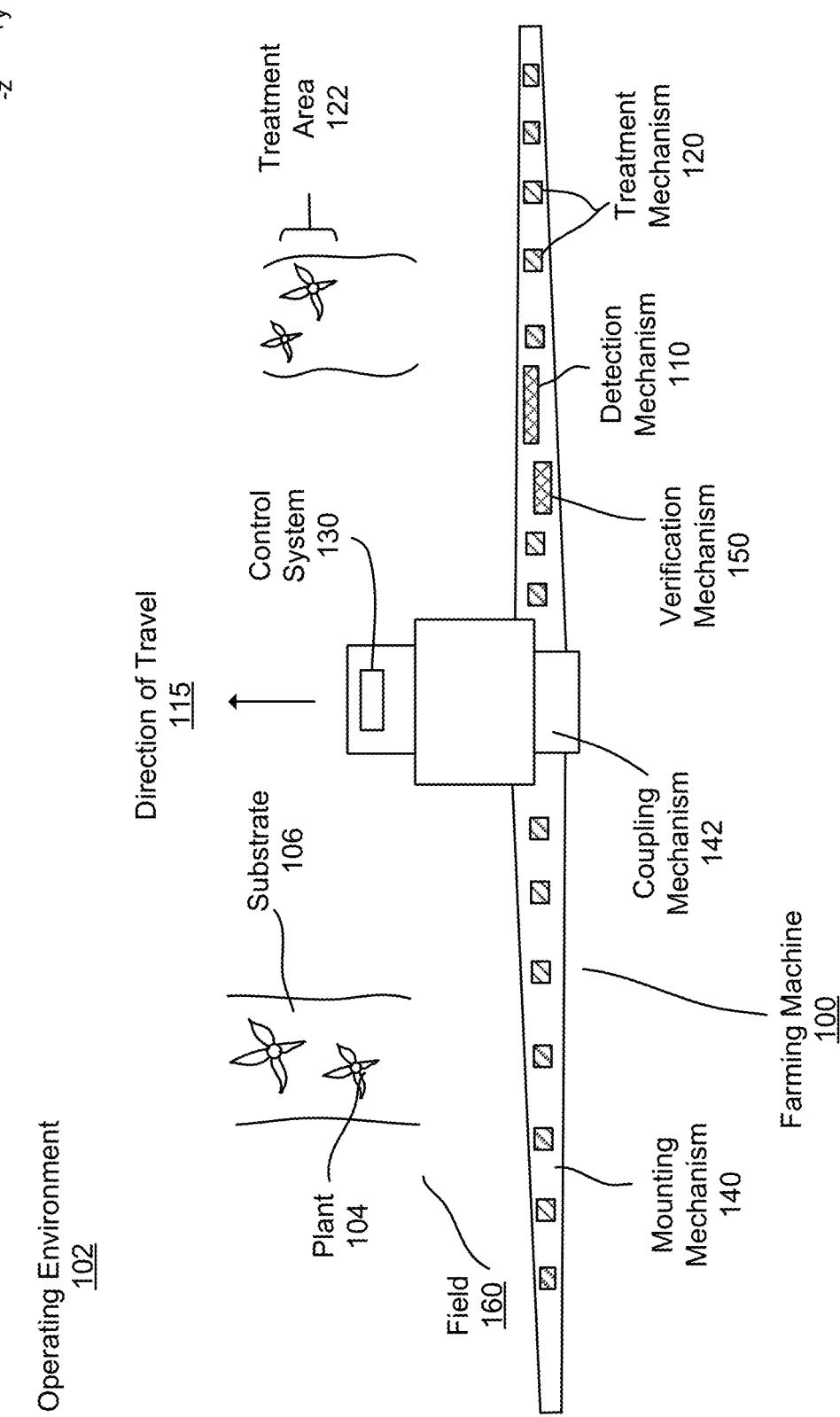
FIG. 1B is a top view of the farming machine 100 in FIG. 1A.
Figure 1C:
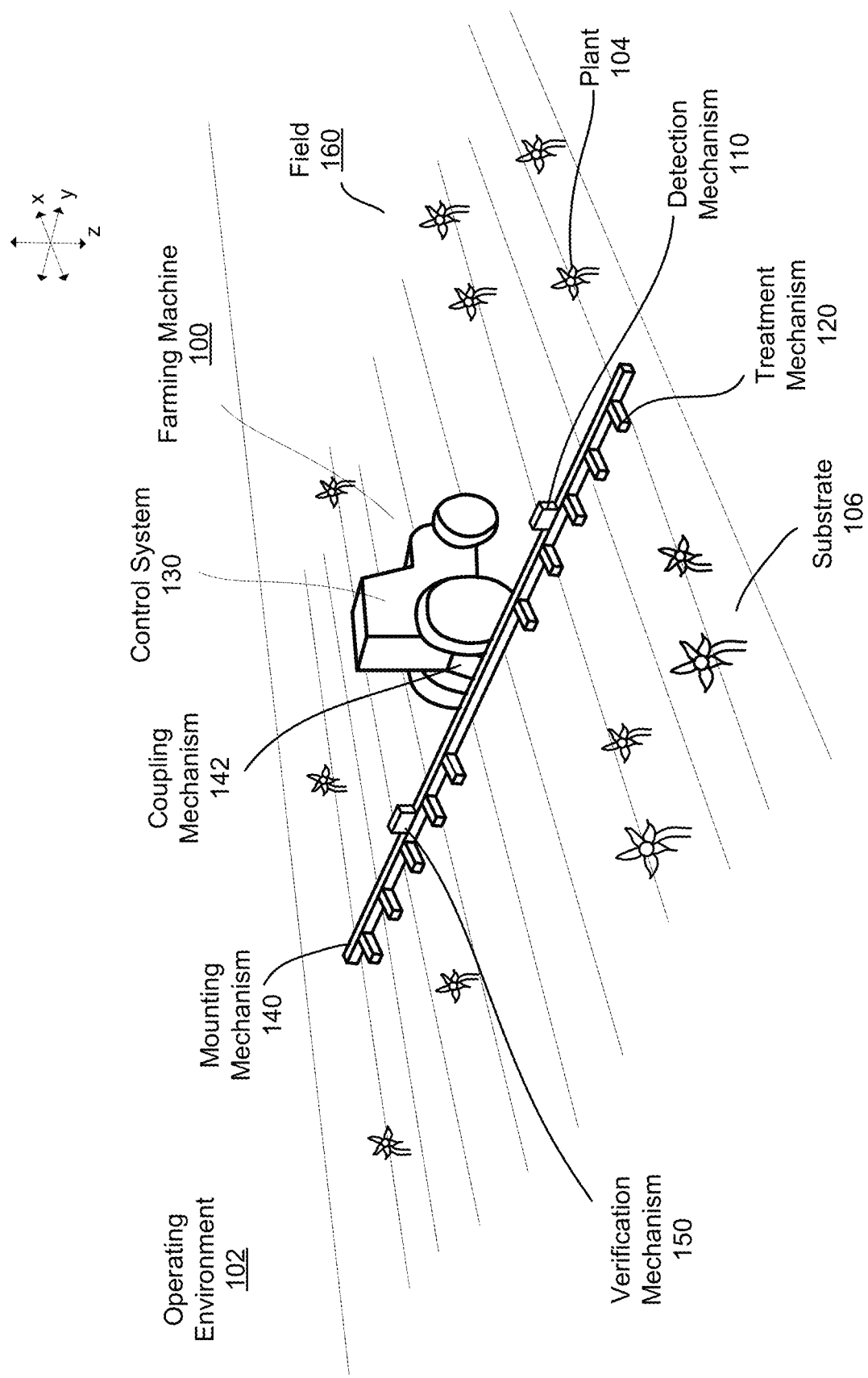
FIG. 1C is an isometric view of another farming machine 100 that performs farming actions of a treatment plan, in accordance with one example embodiment.

FIG. 1A is an isometric view of a farming machine 100 that performs farming actions of a treatment plan, according to one example embodiment, and FIG. 1B is a top view of the farming machine 100 in FIG. 1A. FIG. 1C is an isometric view of another farming machine 100 that performs farming actions of a treatment plan, in accordance with one example embodiment.

The farming machine 100 includes a detection mechanism 110, a treatment mechanism 120, and a control system 130. The farming machine 100 can additionally include a mounting mechanism 140, a verification mechanism 150, a power source, digital memory, communication apparatus, or any other suitable component that enables the farming machine 100 to implement farming actions in a treatment plan. Moreover, the described components and functions of the farming machine 100 are just examples, and a farming machine 100 can have different or additional components and functions other than those described below.

The farming machine 100 is configured to perform farming actions in a field 160, and the implemented farming actions are part of a treatment plan. To illustrate, the farming machine 100 implements a farming action which applies a treatment to one or more plants 104 and/or the substrate 106 within a geographic area. Here, the treatment farming actions are included in a treatment plan to regulate plant growth. As such, treatments are typically applied directly to a single plant 104, but can alternatively be directly applied to multiple plants 104, indirectly applied to one or more plants 104, applied to the environment 102 associated with the plant 104 (e.g., soil, atmosphere, or other suitable portion of the plant's environment adjacent to or connected by an environmental factors, such as wind), or otherwise applied to the plants 104.

In a particular example, the farming machine 100 is configured to implement a farming action which applies a treatment that necroses the entire plant 104 (e.g., weeding) or part of the plant 104 (e.g., pruning). In this case, the farming action can include dislodging the plant 104 from the supporting substrate 106, incinerating a portion of the plant 104 (e.g., with directed electromagnetic energy such as a laser), applying a treatment concentration of working fluid (e.g., fertilizer, hormone, water, etc.) to the plant 104, or treating the plant 104 in any other suitable manner.

In another example, the farming machine 100 is configured to implement a farming action which applies a treatment to regulate plant growth. Regulating plant growth can include promoting plant growth, promoting growth of a plant portion, hindering (e.g., retarding) plant 104 or plant portion growth, or otherwise controlling plant growth. Examples of regulating plant growth includes applying growth hormone to the plant 104, applying fertilizer to the plant 104 or substrate 106, applying a disease treatment or insect treatment to the plant 104, electrically stimulating the plant 104, watering the plant 104, pruning the plant 104, or otherwise treating the plant 104. Plant growth can additionally be regulated by pruning, necrosing, or otherwise treating the plants 104 adjacent to the plant 104.

Operating Environment 102

The farming machine 100 operates in an operating environment 102. The operating environment 102 is the environment 102 surrounding the farming machine 100 while it implements farming actions of a treatment plan. The operating environment 102 may also include the farming machine 100 and its corresponding components itself.

The operating environment 102 typically includes a field 160, and the farming machine 100 generally implements farming actions of the treatment plan in the field 160. A field 160 is a geographic area where the farming machine 100 implements a treatment plan. The field 160 may be an outdoor plant field but could also be an indoor location that houses plants such as, e.g., a greenhouse, a laboratory, a grow house, a set of containers, or any other suitable environment 102.

A field 160 may include any number of field portions. A field portion is a subunit of a field 160. For example, a field portion may be a portion of the field 160 small enough to include a single plant 104, large enough to include many plants 104, or some other size. The farming machine 100 can execute different farming actions for different field portions. For example, the farming machine 100 may apply an herbicide for some field portions in the field 160, while applying a pesticide in another field portion. Moreover, a field 160 and a field portion are largely interchangeable in the context of the methods and systems described herein. That is, treatment plans and their corresponding farming actions may be applied to an entire field 160 or a field portion depending on the circumstances at play.

The operating environment 102 may also include plants 104. As such, farming actions the farming machine 100 implements as part of a treatment plan may be applied to plants 104 in the field 160. The plants 104 can be crops but could also be weeds or any other suitable plant 104. Some example crops include cotton, lettuce, soybeans, rice, carrots, tomatoes, corn, broccoli, cabbage, potatoes, wheat, or any other suitable commercial crop. The weeds may be grasses, broadleaf weeds, thistles, or any other suitable determinantal weed.

More generally, plants 104 may include a stem that is arranged superior to (e.g., above) the substrate 106 and a root system joined to the stem that is located inferior to the plane of the substrate 106 (e.g., below ground). The stem may support any branches, leaves, and/or fruits. The plant 104 can have a single stem, leaf, or fruit, multiple stems, leaves, or fruits, or any number of stems, leaves or fruits. The root system may be a tap root system or fibrous root system, and the root system may support the plant 104 position and absorb nutrients and water from the substrate 106. In various examples, the plant 104 may be a vascular plant 104, non-vascular plant 104, ligneous plant 104, herbaceous plant 104, or be any suitable type of plant 104.

Plants 104 in a field 160 may be grown in one or more plant 104 rows (e.g., plant 104 beds). The plant 104 rows are typically parallel to one another but do not have to be. Each plant 104 row is generally spaced between 2 inches and 45 inches apart when measured in a perpendicular direction from an axis representing the plant 104 row. Plant 104 rows can have wider or narrower spacings or could have variable spacing between multiple rows (e.g., a spacing of 12 in. between a first and a second row, a spacing of 16 in. a second and a third row, etc.).

Plants 104 within a field 160 may include the same type of crop (e.g., same genus, same species, etc.). For example, each field portion in a field 160 may include corn crops. However, the plants 104 within each field 160 may also include multiple crops (e.g., a first, a second crop, etc.). For example, some field portions may include lettuce crops while other field portions include pig weeds, or, in another example, some field portions may include beans while other field portions include corn. Additionally, a single field portion may include different types of crop. For example, a single field portion may include a soybean plant 104 and a grass weed.

The operating environment 102 may also include a substrate 106. As such, farming actions the farming machine 100 implements as part of a treatment plan may be applied to the substrate 106. The substrate 106 may be soil but can alternatively be a sponge or any other suitable substrate 106. The substrate 106 may include plants 104 or may not include plants 104 depending on its location in the field 160. For example, a portion of the substrate 106 may include a row of crops, while another portion of the substrate 106 between crop rows includes no plants 104.

II.A Example Machine Configurations

Detection Mechanism(s)

The farming machine 100 may include a detection mechanism 110. The detection mechanism 110 identifies objects in the operating environment 102 of the farming machine 100.

To do so, the detection mechanism 110 obtains information describing the environment 102 (e.g., sensor or image data), and processes that information to identify pertinent objects (e.g., plants 104, substrate 106, persons, etc.) in the operating environment 102. Identifying objects in the environment 102 further enables the farming machine 100 to implement farming actions in the field 160. For example, the detection mechanism 110 may capture an image of the field 160 and process the image with a plant 104 identification model to identify plants 104 in the captured image. The farming machine 100 then implements farming actions in the field 160 based on the plants 104 identified in the image.

The farming machine 100 can include any number or type of detection mechanism 110 that may aid in determining and implementing farming actions. In some embodiments, the detection mechanism 110 includes one or more sensors. For example, the detection mechanism 110 can include a multispectral camera, a stereo camera, a CCD camera, a single lens camera, a CMOS camera, hyperspectral imaging system, LIDAR system (light detection and ranging system), a depth sensing system, dynamometer, IR camera, thermal camera, humidity sensor, light sensor, temperature sensor, or any other suitable sensor. Further, the detection mechanism 110 may include an array of sensors (e.g., an array of cameras) configured to capture information about the environment 102 surrounding the farming machine 100. For example, the detection mechanism 110 may include an array of cameras configured to capture an array of pictures representing the environment 102 surrounding the farming machine 100. The detection mechanism 110 may also be a sensor that measures a state of the farming machine 100. For example, the detection mechanism 110 may be a speed sensor, a heat sensor, or some other sensor that can monitor the state of a component of the farming machine 100. Additionally, the detection mechanism 110 may also be a sensor that measures components during implementation of a farming action. For example, the detection mechanism 110 may be a flow rate monitor, a grain harvesting sensor, a mechanical stress sensor etc. Whatever the case, the detection mechanism 110 senses information about the operating environment 102 (including the farming machine 100).

A detection mechanism 110 may be mounted at any point on the mounting mechanism 140. Depending on where the detection mechanism 110 is mounted relative to the treatment mechanism 120, one or the other may pass over a geographic area in the field 160 before the other. For example, the detection mechanism 110 may be positioned on the mounting mechanism 140 such that it traverses over a geographic location before the treatment mechanism 120 as the farming machine 100 moves through the field 160. In another examples, the detection mechanism 110 is positioned to the mounting mechanism 140 such that the two traverse over a geographic location at substantially the same time as the farming machine 100 moves through the filed. Similarly, the detection mechanism 110 may be positioned on the mounting mechanism 140 such that the treatment mechanism 120 traverses over a geographic location before the detection mechanism 110 as the farming machine 100 moves through the field 160. The detection mechanism 110 may be statically mounted to the mounting mechanism 140, or may be removably or dynamically coupled to the mounting mechanism 140. In other examples, the detection mechanism 110 may be mounted to some other surface of the farming machine 100 or may be incorporated into another component of the farming machine 100.

Verification Mechanism(s)

The farming machine 100 may include a verification mechanism 150. Generally, the verification mechanism 150 records a measurement of the operating environment 102 and the farming machine 100 may use the recorded measurement to verify or determine the extent of an implemented farming action (i.e., a result of the farming action).

To illustrate, consider an example where a farming machine 100 implements a farming action based on a measurement of the operating environment 102 by the detection mechanism 110. The verification mechanism 150 records a measurement of the same geographic area measured by the detection mechanism 110 and where farming machine 100 implemented the determined farming action. The farming machine 100 then processes the recorded measurement to determine the result of the farming action. For example, the verification mechanism 150 may record an image of the geographic region surrounding a plant 104 identified by the detection mechanism 110 and treated by a treatment mechanism 120. The farming machine 100 may apply a treatment detection algorithm to the recorded image to determine the result of the treatment applied to the plant 104.

Information recorded by the verification mechanism 150 can also be used to empirically determine operation parameters of the farming machine 100 that will obtain the desired effects of implemented farming actions (e.g., to calibrate the farming machine 100, to modify treatment plans, etc.). For instance, the farming machine 100 may apply a calibration detection algorithm to a measurement recorded by the farming machine 100. In this case, the farming machine 100 determines whether the actual effects of an implemented farming action are the same as its intended effects. If the effects of the implemented farming action are different than its intended effects, the farming machine 100 may perform a calibration process. The calibration process changes operation parameters of the farming machine 100 such that effects of future implemented farming actions are the same as their intended effects. To illustrate, consider the previous example where the farming machine 100 recorded an image of a treated plant 104. There, the farming machine 100 may apply a calibration algorithm to the recorded image to determine whether the treatment is appropriately calibrated (e.g., at its intended location in the operating environment 102). If the farming machine 100 determines that the farming machine 100 is not calibrated (e.g., the applied treatment is at an incorrect location), the farming machine 100 may calibrate itself such that future treatments are in the correct location. Other example calibrations are also possible.

The verification mechanism 150 can have various configurations. For example, the verification mechanism 150 can be substantially similar (e.g., be the same type of mechanism as) the detection mechanism 110 or can be different from the detection mechanism 110. In some cases, the detection mechanism 110 and the verification mechanism 150 may be one in the same (e.g., the same sensor). In an example configuration, the verification mechanism 150 is positioned distal the detection mechanism 110 relative the direction of travel 115, and the treatment mechanism 120 is positioned there between. In this configuration, the verification mechanism 150 traverses over a geographic location in the operating environment 102 after the treatment mechanism 120 and the detection mechanism 110. However, the mounting mechanism 140 can retain the relative positions of the system components in any other suitable configuration.

In some configurations, the verification mechanism 150 can be included in other components of the farming machine 100.

The farming machine 100 can include any number or type of verification mechanism 150. In some embodiments, the verification mechanism 150 includes one or more sensors. For example, the verification mechanism 150 can include a multispectral camera, a stereo camera, a CCD camera, a single lens camera, a CMOS camera, hyperspectral imaging system, LIDAR system (light detection and ranging system), a depth sensing system, dynamometer, IR camera, thermal camera, humidity sensor, light sensor, temperature sensor, or any other suitable sensor. Further, the verification mechanism 150 may include an array of sensors (e.g., an array of cameras) configured to capture information about the environment 102 surrounding the farming machine 100. For example, the verification mechanism 150 may include an array of cameras configured to capture an array of pictures representing the operating environment 102.

Treatment Mechanism(s)

The farming machine 100 may include a treatment mechanism 120. The treatment mechanism 120 can implement farming actions in the operating environment 102 of a farming machine 100. For instance, a farming machine 100 may include a treatment mechanism 120 that applies a treatment to a plant 104, a substrate 106, or some other object in the operating environment 102. More generally, the farming machine 100 employs the treatment mechanism 120 to apply a treatment to a treatment area 122, and the treatment area 122 may include anything within the operating environment 102 (e.g., a plant 104 or the substrate 106). In other words, the treatment area 122 may be any portion of the operating environment 102.

When the treatment is a plant treatment, the treatment mechanism 120 applies a treatment to a plant 104 in the field 160. The treatment mechanism 120 may apply treatments to identified plants or non-identified plants. For example, the farming machine 100 may identify and treat a specific plant (e.g., plant 104) in the field 160. Alternatively, or additionally, the farming machine 100 may identify some other trigger that indicates a plant treatment and the treatment mechanism 120 may apply a plant treatment. Some example plant treatment mechanisms 120 include: one or more spray nozzles, one or more electromagnetic energy sources (e.g., a laser), one or more physical implements configured to manipulate plants, but other plant 104 treatment mechanisms 120 are also possible.

Additionally, when the treatment is a plant treatment, the effect of treating a plant 104 with a treatment mechanism 120 may include any of plant necrosis, plant growth stimulation, plant portion necrosis or removal, plant portion growth stimulation, or any other suitable treatment effect. Moreover, the treatment mechanism 120 can apply a treatment that dislodges a plant 104 from the substrate 106, severs a plant 104 or portion of a plant 104 (e.g., cutting), incinerates a plant 104 or portion of a plant 104, electrically stimulates a plant 104 or portion of a plant 104, fertilizes or promotes growth (e.g., with a growth hormone) of a plant 104, waters a plant 104, applies light or some other radiation to a plant 104, and/or injects one or more working fluids into the substrate 106 adjacent to a plant 104 (e.g., within a threshold distance from the plant). Other plant treatments are also possible. When applying a plant treatment, the treatment mechanisms 120 may be configured to spray one or more of: an herbicide, a fungicide, insecticide, some other pesticide, or water.

When the treatment is a substrate treatment, the treatment mechanism 120 applies a treatment to some portion of the substrate 106 in the field 160. The treatment mechanism 120 may apply treatments to identified areas of the substrate 106, or non-identified areas of the substrate 106. For example, the farming machine 100 may identify and treat an area of substrate 106 in the field 160. Alternatively, or additionally, the farming machine 100 may identify some other trigger that indicates a substrate 106 treatment and the treatment mechanism 120 may apply a treatment to the substrate 106. Some example treatment mechanisms 120 configured for applying treatments to the substrate 106 include: one or more spray nozzles, one or more electromagnetic energy sources, one or more physical implements configured to manipulate the substrate 106, but other substrate 106 treatment mechanisms 120 are also possible.

Of course, the farming machine 100 is not limited to treatment mechanisms 120 for plants 104 and substrates 106. The farming machine 100 may include treatment mechanisms 120 for applying various other treatments to objects in the field 160. Some other example treatment mechanisms 120 may include: sprays, physical manipulations, and the like.

Depending on the configuration, the farming machine 100 may include various numbers of treatment mechanisms 120 (e.g., 1, 2, 5, 20, 60, etc.). A treatment mechanism 120 may be fixed (e.g., statically coupled) to the mounting mechanism 140 or attached to the farming machine 100. Alternatively, or additionally, a treatment mechanism 120 may movable (e.g., translatable, rotatable, etc.) on the farming machine 100. In one configuration, the farming machine 100 includes a single treatment mechanism 120. In this case, the treatment mechanism 120 may be actuatable to align the treatment mechanism 120 to a treatment area 122. In a second variation, the farming machine 100 includes a treatment mechanism 120 assembly comprising an array of treatment mechanisms 120. In this configuration, a treatment mechanism 120 may be a single treatment mechanism 120, a combination of treatment mechanisms 120, or the treatment mechanism 120 assembly. Thus, either a single treatment mechanism 120, a combination of treatment mechanisms 120, or the entire assembly may be selected to apply a treatment to a treatment area 122. Similarly, either the single, combination, or entire assembly may be actuated to align with a treatment area, as needed. In some configurations, the farming machine 100 may align a treatment mechanism 120 with an identified object in the operating environment 102. That is, the farming machine 100 may identify an object in the operating environment 102 and actuate the treatment mechanism 120 such that its treatment area aligns with the identified object.

A treatment mechanism 120 may be operable between a standby mode and a treatment mode. In the standby mode the treatment mechanism 120 does not apply a treatment, and in the treatment mode the treatment mechanism 120 is controlled by the control system 130 to apply the treatment. However, the treatment mechanism 120 can be operable in any other suitable number of operation modes.

Control System(s)

The farming machine 100 includes a control system 130. The control system 130 controls operation of the various components and systems on the farming machine 100. For instance, the control system 130 can obtain information about the operating environment 102, processes that information to identify a farming action to implement, and implement the identified farming action with system components of the farming machine 100.

The control system 130 can receive information from the detection mechanism 110, the verification mechanism 150, the treatment mechanism 120, and/or any other component or system of the farming machine 100. For example, the control system 130 may receive measurements from the detection mechanism 110 or verification mechanism 150, or information relating to the state of a treatment mechanism 120 or implemented farming actions from a verification mechanism 150. Other information is also possible.

Similarly, the control system 130 can provide input to the detection mechanism 110, the verification mechanism 150, and/or the treatment mechanism 120. For instance, the control system 130 may be configured input and control operating parameters of the farming machine 100 (e.g., speed, direction). Similarly, the control system 130 may be configured to input and control operating parameters of the detection mechanism 110 and/or verification mechanism 150. Operating parameters of the detection mechanism 110 and/or verification mechanism 150 may include processing time, location and/or angle of the detection mechanism 110, image capture intervals, image capture settings, etc. Other inputs are also possible. Finally, the control system may be configured to generate machine inputs for the treatment mechanism 120. That is translating a farming action of a treatment plan into machine instructions implementable by the treatment mechanism 120.

The control system 130 can be operated by a user operating the farming machine 100, wholly or partially autonomously, operated by a user connected to the farming machine 100 by a network, or any combination of the above. For instance, the control system 130 may be operated by an agricultural manager sitting in a cabin of the farming machine 100, or the control system 130 may be operated by an agricultural manager connected to the control system 130 via a wireless network. In another example, the control system 130 may implement an array of control algorithms, machine vision algorithms, decision algorithms, etc. that allow it to operate autonomously or partially autonomously.

The control system 130 may be implemented by a computer or a system of distributed computers. The computers may be connected in various network environments. For example, the control system 130 may be a series of computers implemented on the farming machine 100 and connected by a local area network. In another example, the control system 130 may be a series of computers implemented on the farming machine 100, in the cloud, on a mobile device, or connected by a wireless area network.

The control system 130 can apply one or more computer models to determine and implement farming actions in the field 160. For example, the control system 130 can apply a plant identification module to images acquired by the detection mechanism 110 to determine and implement farming actions. The control system 130 may be coupled to the farming machine 100 such that an operator (e.g., a driver) can interact with the control system 130. In other embodiments, the control system 130 is physically removed from the farming machine 100 and communicates with system components (e.g., detection mechanism 110, treatment mechanism 120, etc.) wirelessly.

In some configurations, the farming machine 100 may additionally include a communication apparatus, which functions to communicate (e.g., send and/or receive) data between the control system 130 and a set of remote devices. The communication apparatus can be a Wi-Fi communication system, a cellular communication system, a short-range communication system (e.g., Bluetooth, NFC, etc.), or any other suitable communication system.

Other Machine Components

In various configurations, the farming machine 100 may include any number of additional components.

For instance, the farming machine 100 may include a mounting mechanism 140. The mounting mechanism 140 provides a mounting point for the components of the farming machine 100. That is, the mounting mechanism 140 may be a chassis or frame to which components of the farming machine 100 may be attached but could alternatively be any other suitable mounting mechanism 140. More generally, the mounting mechanism 140 statically retains and mechanically supports the positions of the detection mechanism 110, the treatment mechanism 120, and the verification mechanism 150. In an example configuration, the mounting mechanism 140 extends outward from a body of the farming machine 100 such that the mounting mechanism 140 is approximately perpendicular to the direction of travel 115. In some configurations, the mounting mechanism 140 may include an array of treatment mechanisms 120 positioned laterally along the mounting mechanism 140. In some configurations, the farming machine 100 may not include a mounting mechanism 140, the mounting mechanism 140 may be alternatively positioned, or the mounting mechanism 140 may be incorporated into any other component of the farming machine 100.

The farming machine 100 may include locomoting mechanisms. The locomoting mechanisms may include any number of wheels, continuous treads, articulating legs, or some other locomoting mechanism(s). For instance, the farming machine 100 may include a first set and a second set of coaxial wheels, or a first set and a second set of continuous treads. In the either example, the rotational axis of the first and second set of wheels/treads are approximately parallel. Further, each set is arranged along opposing sides of the farming machine 100. Typically, the locomoting mechanisms are attached to a drive mechanism that causes the locomoting mechanisms to translate the farming machine 100 through the operating environment 102. For instance, the farming machine 100 may include a drive train for rotating wheels or treads. In different configurations, the farming machine 100 may include any other suitable number or combination of locomoting mechanisms and drive mechanisms.

The farming machine 100 may also include one or more coupling mechanisms 142 (e.g., a hitch). The coupling mechanism 142 functions to removably or statically couple various components of the farming machine 100. For example, a coupling mechanism may attach a drive mechanism to a secondary component such that the secondary component is pulled behind the farming machine 100. In another example, a coupling mechanism may couple one or more treatment mechanisms 120 to the farming machine 100.

The farming machine 100 may additionally include a power source, which functions to power the system components, including the detection mechanism 110, control system 130, and treatment mechanism 120. The power source can be mounted to the mounting mechanism 140, can be removably coupled to the mounting mechanism 140, or can be incorporated into another system component (e.g., located on the drive mechanism). The power source can be a rechargeable power source (e.g., a set of rechargeable batteries), an energy harvesting power source (e.g., a solar system), a fuel consuming power source (e.g., a set of fuel cells or an internal combustion system), or any other suitable power source. In other configurations, the power source can be incorporated into any other component of the farming machine 100.

Figure 2A:
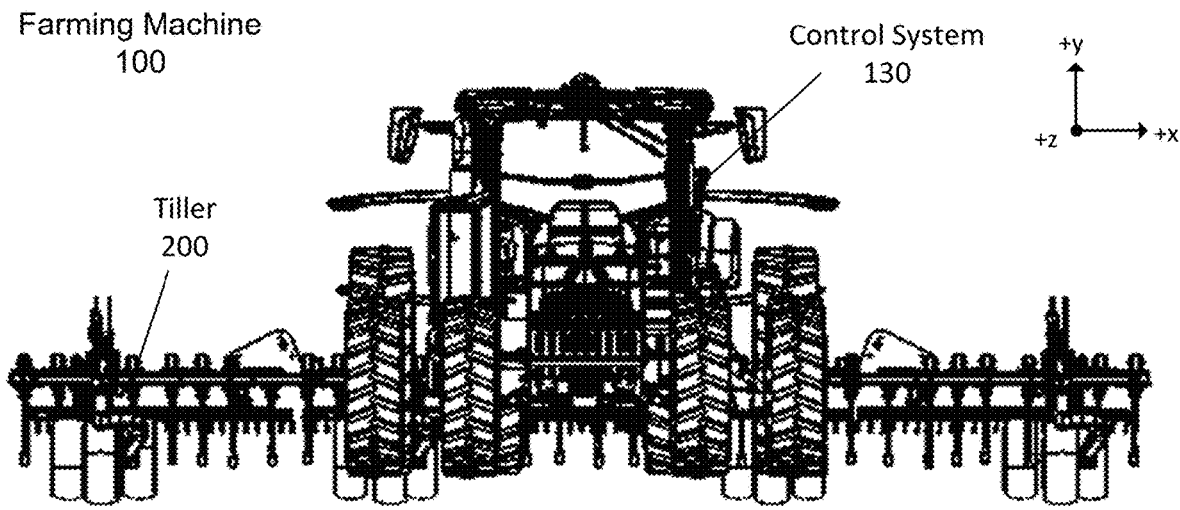
FIG. 2A is a front view of a farming machine, in accordance with an example embodiment.
Figure 2B:
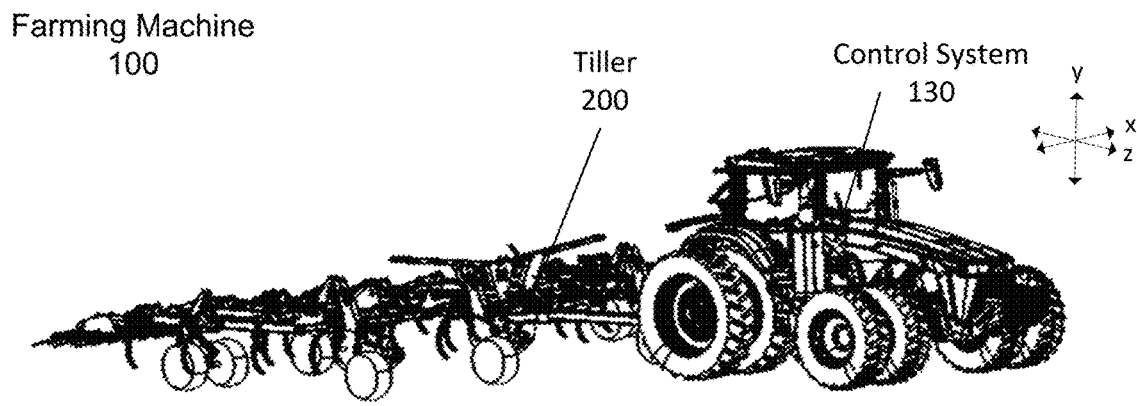
FIG. 2B is an isometric view of a farming machine, in accordance with an example embodiment.
Figure 2C:
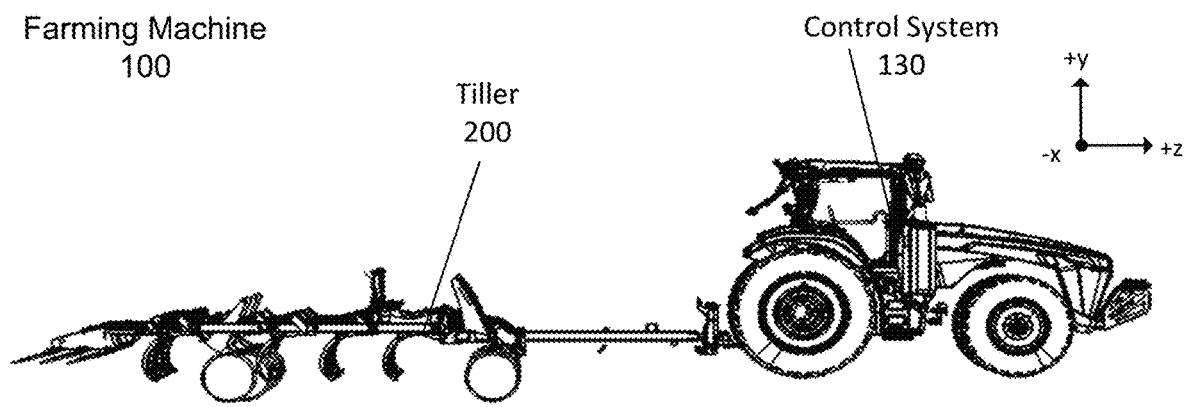
FIG. 2C is a side view of a farming machine, in accordance with an example embodiment.
Figure 2D:
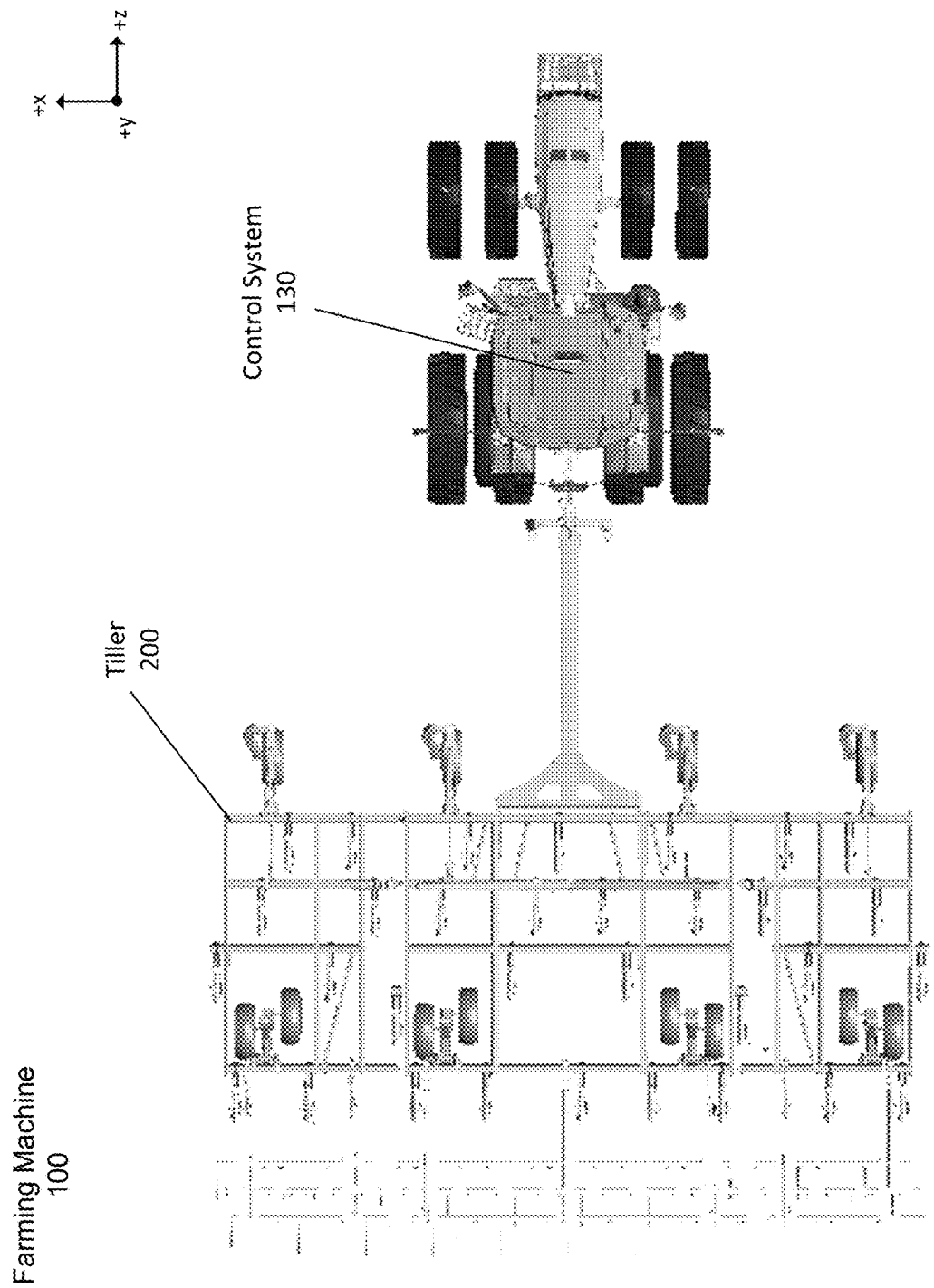
FIG. 2D is a top view of a farming machine, in accordance with an example embodiment.

FIGS. 2A-D depict a farming machine 100 with a tiller, in accordance with an example embodiment. For example, FIG. 2A is a front view of the embodiment of the farming machine 100 and FIG. 2B is an isometric view of the embodiment of the farming machine 100 of FIG. 2A. FIG. 2C is a side view of the embodiment of the farming machine 100 and FIG. 2D is a top view of the embodiment of the farming machine 100.

The farming machine 100 may use field action mechanisms coupled to a tiller 200 of the farming machine to complete the field actions. The field actions may include tilling, spraying, or otherwise treating a plant or portion of the field, as previously described in relation to FIGS. 1A-E. Further, the farming machine includes a control system 130 for controlling operations of system components of the farming machine 100 to take field actions and may include any of the other components, mechanisms, networks, and sensors previously described in relation to FIGS. 1A-1C.

II.B System Environment

Figure 3:
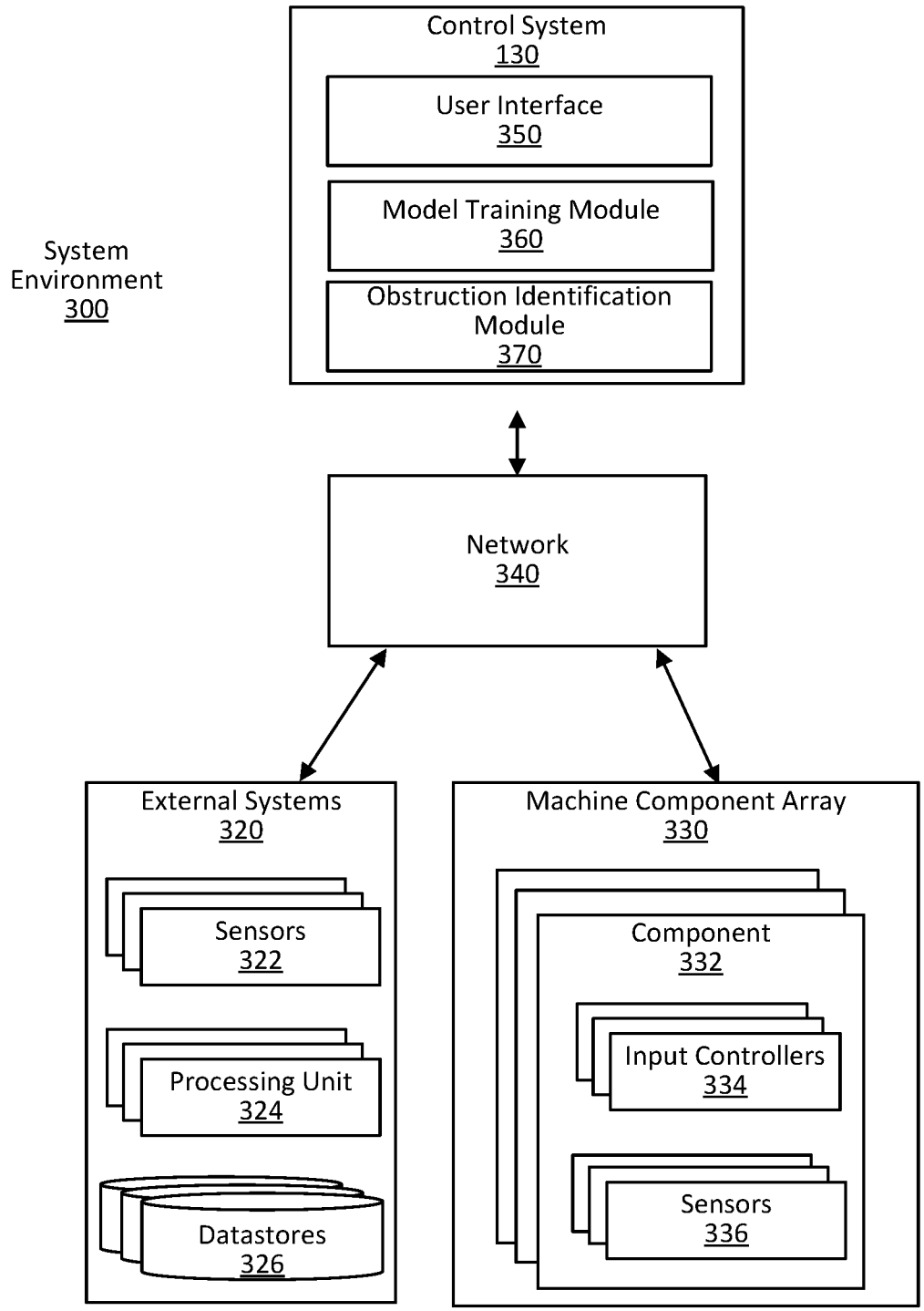
FIG. 3 is a block diagram of a system environment of a farming machine, in accordance with an example embodiment.

FIG. 3 is a block diagram of the system environment for the farming machine 100, in accordance with one or more example embodiments. In this example, the control system 130 is connected to external systems 320 and a machine component array 330 via a network 340 within the system environment 300.

The external systems 320 are any system that can generate data representing information useful for detecting obstructions in a field. For example, an external system 320 may be a mobile device or other computer. External systems 320 may include one or more sensors 322, one or more processing units 324, and one or more datastores 326. The one or more sensors 322 can measure the field 160, the operating environment 102, the farming machine 100, etc. and generate data representing those measurements. For instance, the sensors 322 may include a rainfall sensor, a wind sensor, heat sensor, a camera, etc. The processing units 324 may process measured data to provide additional information that may aid in detecting obstructions in the field. For instance, a processing unit 324 may access an image of a field 160 and calculate a weed pressure from the image or may access historical weather information for a field 160 to generate a forecast for the field. Datastores 326 store historical information regarding the farming machine 100, the operating environment 102, the field 160, etc. that may be beneficial in detecting obstructions in the field. For instance, the datastore 326 may store results of previously implemented treatment plans and farming actions for a field 160, a nearby field, and or the region. The historical information may have been obtained from one or more farming machines (i.e., measuring the result of a farming action from a first farming machine with the sensors of a second farming machine). Further, the datastore 326 may store results of specific faming actions in the field 160, or results of farming actions taken in nearby fields having similar characteristics. The datastore 326 may also store historical weather, flooding, field use, planted crops, etc. for the field and the surrounding area. Finally, the datastores 326 may store any information measured by other components in the system environment 300.

The machine component array 330 includes one or more components 332. Components 322 are elements of the farming machine 100 that can take farming actions (e.g., a treatment mechanism 120). As illustrated, each component has one or more input controllers 334 and one or more sensors 336, but a component may include only sensors 336 or only input controllers 334. An input controller 334 controls the function of the component 332. For example, an input controller 334 may receive machine commands via the network 340 and actuate the component 330 in response. A sensor 326 generates data representing measurements of the operating environment 102 and provides that data to other systems and components within the system environment 300. The measurements may be of a component 332, the farming machine 100, the operating environment 102, etc. For example, a sensor 326 may measure a configuration or state of the component 322 (e.g., a setting, parameter, power load, etc.), measure conditions in the operating environment 102 (e.g., moisture, temperature, etc.), capture information representing the operating environment 102 (e.g., images, depth information, distance information), and generate data representing the measurement(s).

The control system 130 receives information from external systems 320 and the machine component array 320 and implements a treatment plan in a field with a farming machine. The control system 130 includes a user interface module 350, a model training module 360, and an obstruction identification module 370. The modules of the control system act in concert to identify obstructions from image data captured by a farming machine 100 in a field and modify treatment instructions carried out by the farming machine 100 based on identified obstructions. In some embodiments, the control system 130 has more or different components than those shown in FIG. 3. In other embodiments, the components shown in FIG. 3 may be combined or removed. The obstruction identification module 370 and the module training module 360 are further described in relation to FIG. 4. The user interface module 350 is further described below.

The user interface module 350 allows an operator to interact with the control system 130 to label captured images for obstruction identification. For example, the interface module 350 provides an interface that facilitates an operator identifying obstructions and training the control system 130 to identify those obstructions in the future. In some embodiments, the user interface module 350 may be integrated into a computer connected to the control system 130 (rather than being directly integrated into the control system 130). The interface module 350 may provide one interface for an operator to identify obstructions in image data, send instructions to actors in a field, or the like. In some cases, the interface module 350 presents an interface to multiple operators, who may interact with the interface to label image data with obstructions or collect new image data of actors in a field.

The user interface module 350 comprises various elements that allow an operator to interact with the control system 130 to facilitate image labelling and model training. For example, the user interface module 350 may comprise visual and/or audio elements, input controls allowing user interaction with the control system 130, and output controls for outputting information within the system environment 300, but other elements are also possible. Any of the information input, output, received, or transmitted by the interface module 350 may be stored by the control system 130.

Elements of the interface module 350 allows an operator to perform several distinct operations for image labelling and model training using the farming machine 100 and control system 130. Some of these actions are described below.

First, the user interface module 350 may provide prescribed actions to an operator (or some other device) within the system environment 300. Prescribed actions are descriptions of actions for actors in a training field to take. The prescribed actions simulate various obstructions that may occur within the field (e.g., a person lying in a bale of hay, placing a bicycle in the field, checking their phone, etc. for the farming machine 100 or a person in a construction hat, bulldozing, etc. for a construction machine). Examples of prescribed actions include: putting arms at side, crossing arms, putting hands on hips, checking phone, taking picture with phone, talking on phone, pointing at something, looking up at the sky, looking at dirt/ground while standing, looking at dirt/ground while bending over, waving arms, performing a smoking motion, putting hands near face, performing a drinking motion, crouching, kneeling, lying down, walking, running, waving a flag, using a jackhammer, moving planks of wood or other construction/farming equipment, and wearing a hard hat/helmet. In this manner, actors around the farming machine 100 may simulate obstructions, or create obstructions, that do not commonly occur as the farming machine performs normal farming actions.

To illustrate, the user interface module 350 may send a message to a mobile device (e.g., an external system 320) indicating for an actor to "sit in bale of hay in the North-west corner of field." The actor may move to the North-west corner of the field and sit in a bale of hay until the user interface module 350 sends a new message indicating for the actor to "jog around the bale of hay in the South-east corner of the field." In other examples, the message may contain more detailed instructions for the actor to follow, including a direction to face, an orientation to perform the prescribed action in, or multiple prescribed actions to perform at one time. The messages may be used as labelling information in some embodiments. Further, the user interface module 350 may receive labelling information directly entered by an operator including a textual description of a prescribed action captured in the image data.

Second, the user interface module 350 enables capturing (or accessing) image data. For example, the user interface module 350 may record an input from an operator that causes the farming machine 100 to capture image data. Typically, an operator will capture image data when an obstruction appears in the environment. Similarly, the user interface module 350 may record an input from an operator to access previously obtained image data. In this case, the accessed image data generally includes a representation of an obstruction.

To illustrate, the operator may indicate for the farming machine 100 to capture an image of an actor performing a prescribed action. In this example, the image data is captured by a farming machine in a training field. A training field is a field where the farming machine 100 may capture image data of actors taking prescribed actions in a controlled environment. A plurality of different training fields may be used for capturing image data of actors. Similarly, the farming machine may access images provided to the control system 130 from an outside source. Of course, image data may also be obtained from a farming machine conducting farming actions in a commercial field, but uncommon obstructions that can be manifested as prescribed actions are less likely to occur in these situations.

Finally, the user interface module 350 receives (e.g., through user input) labelling information for image data. Labelling information is any data that may assist in labelling the image data. Here, labelling information is typically associated with any obstruction (i.e., prescribed action) represented in the image data, but could also include other information useful in labelling images. Some example labelling information may include information associated with the image data such as time, location, obstruction type, etc.

To illustrate, labelling information may describe a location. The location is where an obstruction was, will be, or is simulated in the field. This labelling information may include any information sufficient to represent a spatial coordinate in the field (e.g., latitude and longitude, GPS coordinate, location relative to the farming machine 100 at the time the image data was captured, etc.). In another illustration, labelling information may describe a time. The time when the obstruction occurred, will occur, or is occurring in the field. This labelling information may include any information sufficient to represent temporal information describing the image data. Furthermore, labelling information may describe ambient conditions. Ambient conditions are conditions in the field (e.g., cloudy), of the machine, or surrounding the machine (e.g., dusty) that would allow for more accurate identification of obstructions if the ambient conditions were used as a label. Furthermore, the labelling information may describe an orientation. The orientation is the orientation of the obstruction when the obstruction occurred, will occur, or is occurring. This labelling information may be a cardinal direction (i.e., North, South, East, or West), a direction relative to the farming machine 100 (e.g., towards the front of the farming machine 100), or some other representation of orientation. Other types of labelling for are also possible.

The labelling information may also include specific portions of the image data that include an obstruction. For example, an operator may indicate, via the interface, a grouping of pixels that represent the obstruction. The operator may indicate a grouping of pixels by drawing a box around the obstruction or filling in pixels representing the obstruction via the interface.

Additionally, labelling information may describe an obstruction represented in the image data (e.g., a prescribed action). For example, an operator may capture an image of an actor performing a prescribed action of an uncommon obstruction (e.g., "worker waving with both hands"). The labelling information, therefore, can be any information that identifies the prescribed action captured in the image (e.g., name, class, etc.). Moreover, labelling information describing obstructions can be received in a variety of manners. For example, the image data may be automatically labelled with the prescribed action the image data is associated with the prescribed action in some manner. In this case, if the image data is captured at a prescribed time, the labelling information may automatically include the prescribed action performed at that time. In another example, the labelling information describing obstructions may be received from an operator at the time the image data is obtained.

The network 340 connects nodes of the system environment 300 to allow microcontrollers and devices to communicate with each other. In some embodiments, the components are connected within the network as a Controller Area Network (CAN). In this case, within the network each element has an input and output connection, and the network 340 can translate information between the various elements. For example, the network 340 receives input information from the camera array 310 and component array 320, processes the information, and transmits the information to the control system 130. The control system 130 generates a farming action based on the information and transmits instructions to implement the farming action to the appropriate component(s) 322 of the component array 320.

Additionally, the system environment 300 may be other types of network environments and include other networks, or a combination of network environments with several networks. For example, the system environment 300, can be a network such as the Internet, a LAN, a MAN, a WAN, a mobile wired or wireless network, a private network, a virtual private network, a direct communication line, and the like.

III.A Model Training Module

Figure 4A:
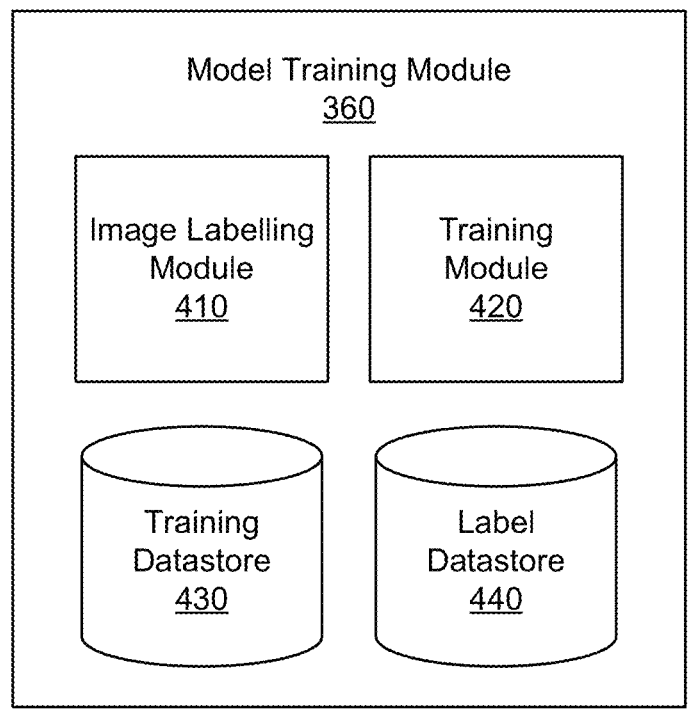
FIG. 4A is a block diagram of a model training module, in accordance with an example embodiment.

The model training module 360 trains one or more machine learning models to identify obstructions in image data. FIG. 4A is a block diagram of a model training module 360, in accordance with an example embodiment. The model training module 360 includes an image labelling module 410, a training module 420, a training datastore 430, and a label datastore 440. In some embodiments, the model training module 360 may include more or less components than shown in FIG. 4A.

The image labelling module 410 labels images which can then be used to train a machine learning model. To do so, the image labelling module accesses image data representing a field captured by the camera system 110. As described before, the image data may include a representation of an actor performing a prescribed action. The image data can be received from various sources. For example, the image labelling module 410 may access image data directly from a camera system 110 of the farming machine 100 while the farming machine is stationary in a field (rather than performing farming actions). In another example, the image labelling module may receive image data from another farming machine or device participating in the labelling process. Other examples are also possible.

The labelling module 410 also accesses any labelling information corresponding to the accessed image data. The labelling information generally corresponds to a prescribed action represented in the image data. As described above, the labelling information may be entered in real time by an operator via the user interface module 350, or be previously associated with the image data. The labelling information may be stored in the label datastore.

The image labelling module 410 labels the image data with the labelling information. At a high level, labelling can include labelling all the image data with all corresponding labelling information. For instance, the image labelling module 410 may label image data with the prescribed action, a geographic location, time, orientation, and/or direction included in the labelling information. However, at a more granular level, the image labelling module may label specific portions of an image with the labelling information. To illustrate, take, for example, image data including a representation of an actor performing a prescribed action and additional areas of the field surrounding the actor. The image labelling module 410 may label solely the portion of the image comprising the actor with the labelling information, rather than the entire image. That is, the portion of the image data surrounding the actor will remain unlabeled. Labelling specific portions of the image data may include enclosing the represented obstruction in a shape (e.g., a box), or may include identifying specific pixels in the image data representing the obstruction.

In some instances, the image labelling module 410 may select image data for further labelling based on some of its corresponding labelling information. For example, the image labelling module 410 may select image data that occurred at a prescribed location and prescribed time for further labelling (e.g., "South middle of field" and "3:30 pm") because an actor was known to be performing a prescribed action at that time and place. In another example, the image labelling module may select image data based on specific keywords in the labelling information (e.g., child) because those obstructions are known to be rare or important. Whatever the case, the image labelling module is configured to prioritize labelling image data with uncommon obstructions, rather than all image data captured by the farming machine.

The various tasks of the image labelling module 410 may be performed autonomously, semi-autonomously, or manually, depending on the configuration. For example, in the autonomous case, the image labelling module may automatically label all images obtained at a prescribed time with the prescribed action occurring at that time. In another example, in the semi-autonomous case, the image labelling module 410 may automatically access image data of an actor performing a prescribed action at a prescribed time. The image data is then provided to an operator via the image user interface module which is then labelled at a more granular level. In another example, in the manual case, the image labelling module 410 may access image data (e.g., capturing an image) at the command of an operator via the user interface module, and the operator then labels the image. Other examples and combinations of methodologies are also possible.

The training module 420 trains one or more machine learning models. To do so, the training module 420 retrieves labelled image data from the training datastore 430 and inputs the labelled image data to the one or more machine learning models. Inputting the labelled image data trains the underlying structure of the machine learning model to recognize representations of previously labelled obstructions in the image data. To illustrate, an operator labels an array of image data as including an obstruction performed as a prescribed action. Because the image data is labelled with the obstruction, the training module 420 can the train machine learning model to identify latent information on the array of image data indicative of the particular obstruction. Afterwards, the machine learning model can identify the obstructions by recognizing that same latent information in other image data.

In some instances, the training module 420 may test the machine learning model's efficacy using the labelled array of image data. For example, before using the machine learning model to detect obstructions in real-time, the training module 420 may apply the machine learning model to the image data. If the machine learning model detects obstructions in the image data matching the labels, then the training module 420 may deem the machine learning model ready to use for real-time obstruction identification. Otherwise, the training module 420 may retrain the machine learning model.

In some embodiments, the user interface 350 sends a message to a mobile device of an actor in a field. The message may indicate a prescribed action for the actor to perform in the field. The farming machine 100 captures image data of the actor performing the prescribed action, and the image labelling module 410 labels the image data with the message. The training module 420 trains the machine learning model on the labeled image data. The machine learning model may be trained to receive image data as input and output a confidence score indicating a likelihood that an obstruction is present in the image data.

III.B Obstruction Identification Module

Figure 4B:
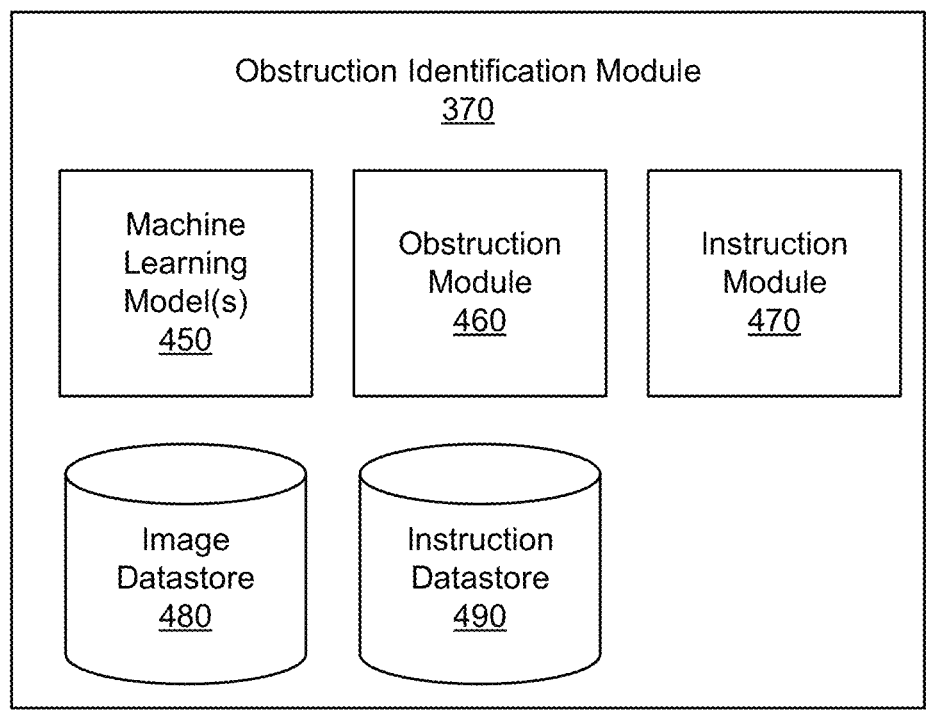
FIG. 4B is a block diagram of an obstruction identification module, in accordance with an example embodiment.

The obstruction identification module 370 identifies obstructions and modifies treatment instructions such that the farming machine 100 (or, in some embodiments, construction machine) may avoid the obstructions when traversing the field. FIG. 4B is a block diagram of an obstruction identification module 370, in accordance with an example embodiment. The obstruction identification module 370 includes one or more machine learning models 450, an obstruction module 460, an instruction module 470, an image datastore 480, and an instruction datastore 490. In some embodiments, the obstruction identification module 370 may include more or less components than shown in FIG. 4B.

The machine learning models 450 are one or more machine learning models that may identify obstructions in captured image data. The machine learning models may be, for example, a deep neural network, a convolutional neural network, or any other type of suitable machine learning model. Here, the machine learning models 450 include a pixel model, a point cloud model, and a bounding box model, but could include additional or fewer models.

The pixel model may detect pixels in the image data that represent obstructions. The pixel model may be a pixelwise segmentation model, as described in U.S. application Ser. No. 16/126,842, filed on Sep. 10, 2018, which is incorporated by reference herein in its entirety. As a brief example, the pixel model may be a convolutional neural network including an input layer, an identification layer, and an output layer, with each layer connected to one another via zero or more additional hidden layers. The pixel model outputs an image where obstructions are labelled at the pixel level in the image. The labels may also indicate a measure of confidence quantifying a likelihood an obstruction is shown in the image data (e.g., a measure of confidence indicating a 70% chance that the image data depicts an obstruction). The pixel model is trained based on image data captured in a training field with pixels in the image data labelled as representing obstructions or not representing obstructions, as described in relation to the training module 420.

The point cloud model may determine point clouds in the image data that represent obstructions. The point cloud model may be similar to the model described in U.S. application Ser. No. 17/033,318, filed on Sep. 25, 2020 which is incorporated by reference herein in its entirety. There, the point cloud identifies plants, but the principles are the same for obstruction identification. That is, the point cloud model takes the image data as input and outputs a measure of confidence indicating a likelihood an obstruction is shown in the image data. The point cloud model is trained based on image data captured in a training field with point clouds in the image data labelled as representing obstructions, as described in relation to the training module 420.

The bounding box model may detect bounding boxes in the image data representing obstructions. The bounding box model may generate bounding boxes enclosing portions of the image data that the model has identified represent obstructions. The bounding box model is described in U.S. application Ser. No. 15/975,092, filed on May 9, 2018, which is incorporated by reference herein in its entirety. The bounding box model takes the image data as input and outputs a measure of confidence indicating a likelihood an obstruction is shown in the image data. The bounding box model is trained based on image data captured in a training field with bounding boxes in the image data labelled as representing obstructions, as described in relation to the training module 420.

The obstruction module 460 determines whether the image data contains an obstruction. To do so, the obstruction module 460 may retrieve image data representing obstructions in the field. The image data may be received directly from the camera system 110 in real-time as the farming machine 100 captures the image data, or from the image datastore 460. The obstruction module 460 inputs the image data into the one or more machine learning models 450 and receives a measure of confidence indicating a likelihood that the image data depicts an obstruction. The obstruction module 460 may input the image data into the one or more models in parallel, or use a serial application of the models.

The obstruction identification module 460 can employ a variety of methodologies to identify instruction when employing one or more machine learning models. For example, if at least one machine learning model 450 returns a measure of confidence above a threshold value, the obstruction module 460 determines that an obstruction is present in the image data. If none of the measures of confidence are above the threshold value, the obstruction module 460 determines that an obstruction is not depicted in the image data. In another example, if an average of the measure of confidence received from each machine learning model 450 is above the threshold value, the obstruction module 460 determines that an obstruction is present in the image data. Whatever the configuration of the models, if the obstruction module 460 identifies an obstruction, the obstruction module 460 sends an indication of the obstruction to the instruction module 470.

The instruction module 470 receives indications of obstructions from the obstruction module 480. In response to receiving an indication of an obstruction, the instruction module 470 retrieves treatment instructions, such as field action instructions, from the instruction datastore 490. The treatment instructions indicate actions for the farming machine 100 to take to complete a farming objective (e.g., spraying plants, tilling a field, etc.). The farming objective may relate directly to treating plants in the field or to take another farming action in the field. The treatment instructions may indicate a path through the field for the farming machine 100 to take along with actions for components of the farming machine to do to complete the farming objective.

The instruction module 470 modifies the treatment instructions to avoid the obstruction in the field. Some modifications include applying the brakes to stop the farming machine, turning on an audible or visual alarm, sending a notification via the user interface alerting the operator to the obstruction, stopping treatment mechanisms, and altering the path of the farming machine 100 in the field. Other modifications include adding instructions to actuate a treatment mechanism, modify an operating parameter, modify a treatment parameter, and/or modify a sensor parameter when modifying the treatment instructions. For example, the instructions may cause the farming machine 100 to rotate a component. The instruction module 470 may modify the treatment instructions in multiple ways and may store the modified treatment instructions in the instruction datastore 490.

In some embodiments, the obstruction identification module 370 identifies an obstruction in a filed as the farming machine 100 is implementing a farming objective. The obstruction module 460 accesses the machine learning model 450. The machine learning model 450 may be configured to identify obstructions in a field from image data of the field may be generated by the model training module 360 accessing image data of obstructions in a training field, where each obstruction corresponds to a prescribed action occurring at a prescribed time, labelling the image data of the obstructions based on the prescribed time that the corresponding prescribed action occurred, and training the obstruction model to identify obstructions in the field using the labelled image data. The farming machine 100 captures image data of the field including an obstruction, which is sent to the obstruction module 460. The obstruction module 460 inputs the image data into the machine learning model 450 to identify obstructions in the field. In embodiments where the obstruction module 460 uses multiple machine learning models 450, the obstruction module 460 identifies obstructions based on outputs from each of the one or more machine learning models 450. Responsive to identifying an obstruction, the instruction module 470 modifies treatment instructions to be executed by the farming machine 100 for implementing the farming objective, such that execution of the modified treatment instructions causing the farming machine to avoid the obstruction in the field. In some embodiments, the modified treatment instructions cause the farming machine 100 to stop moving, send a notification to an external operator via the user interface 350 to get instructions based on the obstruction, and proceed according to instructions from the external operator.

IV. Example Use Case Environment

Figure 5:
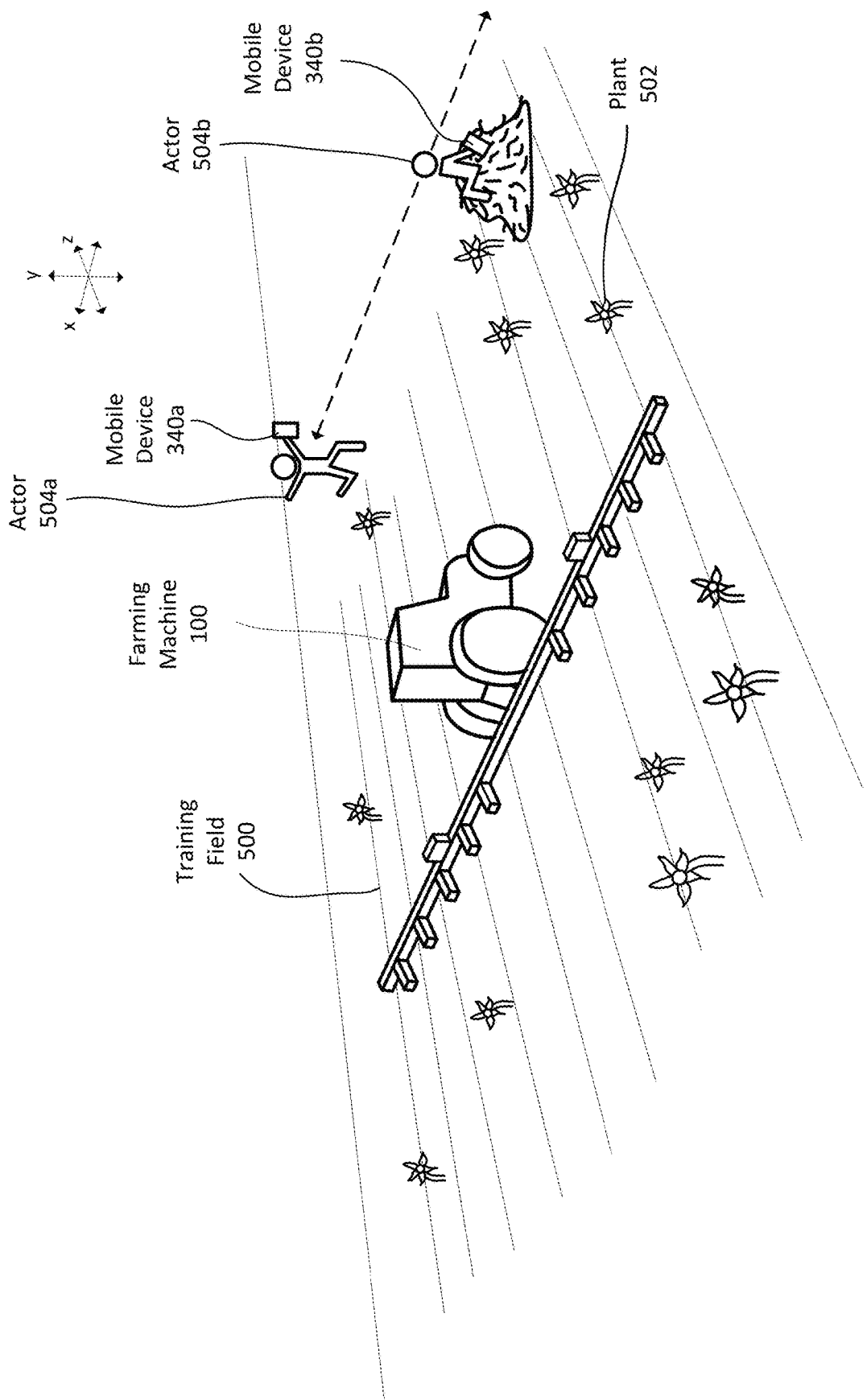
FIG. 5 illustrates an example of a farming machine in a training field, in accordance with an example embodiment.

FIG. 5 illustrates an example of a farming machine 100 in a training field 500, in accordance with an example embodiment. The training field may contain one or more plants 502 and one or more actors 504 performing prescribed actions. Each actor may possess a mobile device 506 that can communicate with the control system 130 of the farming machine 100. An operator may send prescribed actions to each mobile device 506 via the user interface 350 of the control system 130. Alternatively or additionally, the operator may give each actor verbal instructions to complete prescribed actions. For example, in FIG. 5, one actor 504a may be performing the prescribed action "running" and the other actor 504b may be performing the prescribed action "sitting in hay bale," which are actions workers may be doing on a farm while a farming machine is operating. Each prescribed action may be associated with a specific location, specific time, and orientation for the prescribed action to be performed at, which may be communicated from the control system 130 to the respective mobile device 506.

The camera system 110 of the farming machine 100 may capture image data of the training field 500 as the actors perform the prescribed actions. The control system 130 of the farming machine 110e may label the image data with the prescribed actions. Further, in some embodiments, the operator may add information to the control system 130 to be associated with image data during labelling. These embodiments may occur when capturing image data in a training field 500 or may occur during normal operation of the farming machine 100 for farming objectives. For example, the operator may indicate that the bale of hay depicted in FIG. 5 is has an actor 504a on it, and the image data of the bale of hay may be labelled to reflect that the bale of hay has a person on it. Once the image data of the prescribed actions has been captured, the operator may send, using the control system 130, new prescribed actions to the mobile devices 506 of actors 504, who may perform the new prescribed actions as the farming machine 100 captures more image data.

V. Process for Obstruction Detection

Figure 6:
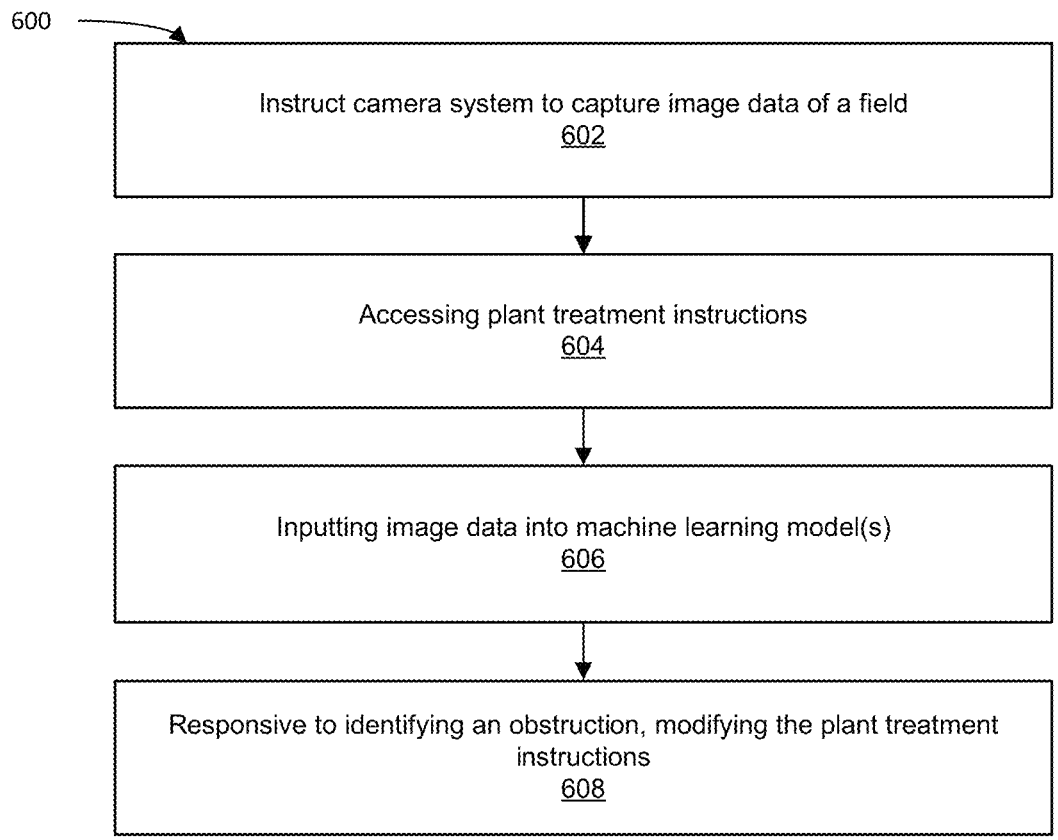
FIG. 6 is a flow chart illustrating a method of modifying plant treatment instructions for a farming machine, in accordance with an example embodiment.

FIG. 6 is a flow chart illustrating a method of modifying treatment instructions for a farming machine 100, in accordance with an example embodiment. The steps of FIG. 6 may be performed by the control system 130 of the farming machine 100. However, in other embodiments, some or all of the steps may be performed by other entities or systems, such as a construction machine. In addition, other embodiments may include different, additional, or fewer steps, and the steps may be performed in different orders.

The control system 130 instructs the camera system 110 to capture 602 image data of a field. The control system 130 may also access previously captured image data of the field. The camera system 110 may capture the image data in real-time as the farming machine 100 traverses the field, or, in some embodiments, the image data may be captured by a farming machine and transferred to, or accessed by, the control system 130. The control system 130 accesses 604 treatment instructions from the instruction datastore 490 based on the image data. The treatment instructions describe actions for the farming machine 100 to take to complete a farming objective as it traverses the field. In some embodiments, the control system 130 may access other field action instructions from the instruction store 490. Further, the control system 130 may select the treatment instructions based on the image data. For example, the control system 130 may detect the location of plants in the field using the image data and select the treatment instructions to most efficiently treat the plants based on their locations.

The control system 130 inputs the image data into one or more machine learning models 450. The machine learning models 450 may include a pixel model, a point cloud model, and a bounding box model. The machine learning models 450 assess the image data to identify any obstructions in the field. The machine learning models 450 each output a measure of confidence indicating a likelihood that an obstruction is present in the image data. The control system 130 determines whether an obstruction is present based on one or more of the measures of confidence. For example, if one (or more) measure of confidence is above a threshold value, the farming machine 100 may determine that an obstruction is present. Responsive to identifying an obstruction, the control system 130 modifies the treatment instructions to avoid the obstruction while traversing the field. Such modifications may include stopping the farming machine 100, controlling the farming machine 100 to move around the obstruction, sounding an alarm, notifying an operator of the obstruction, or actuating one or more components of the farming machine 100. If the control system 130 does not detect an obstruction, the control system 130 may control the farming machine 100 to continue to traverse the field to complete the farming objective.

VI. Example Model Training

Figure 7:
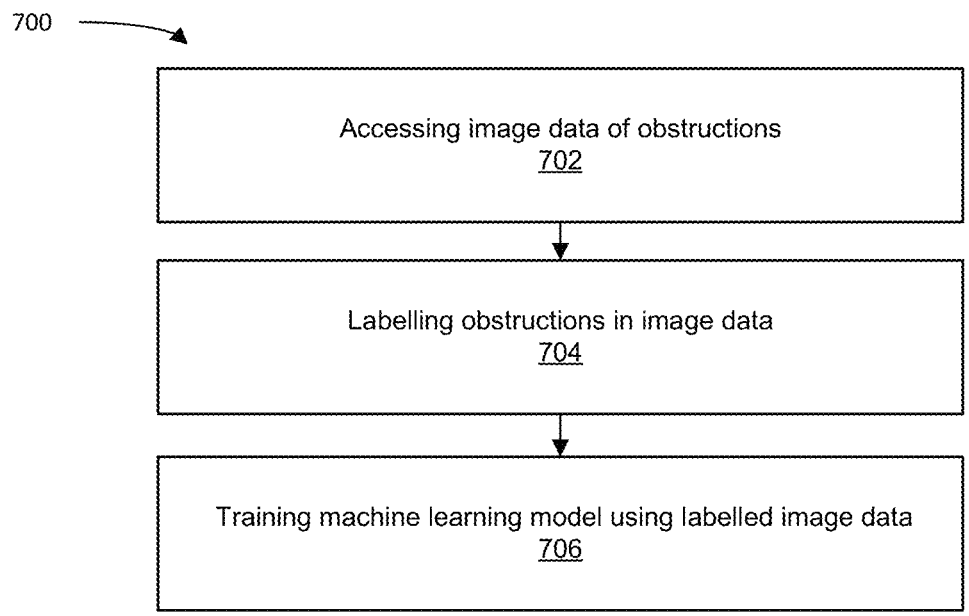
FIG. 7 is a flow chart illustrating a method of training one or more machine learning models, in accordance with an example embodiment.

FIG. 7 is a flow chart illustrating a method 700 of training one or more machine learning models 450, in accordance with an example embodiment. The steps of FIG. 7 may be performed by the control system 130, though in other embodiments, some or all of the steps may be performed by other entities or systems. In addition, other embodiments may include different, additional, or fewer steps, and the steps may be performed in different orders.

The control system 130 accesses 702 image data of obstructions in a training field. Each obstruction in the image data corresponds to a prescribed action performed by an actor in the training field labelled with labelling information. Messages indicating prescribed actions for actors in the field to perform may be sent from the control system 130 to mobile devices 506 associated with the actors. The control system 130 may iterate between sending messages describing prescribed actions to the mobile devices 506 and capturing image data of the prescribed actions being performed, as instructed by an operator.

The control system 130 labels 704 the image data based on the labelling information describing the location, time, and/or orientation the prescribed action occurred at. The image data may be further labelled, such as manually by an administrator, to obtain more granularity for training the one or more machine learning models 450. The control system 130 trains 706 the one or more machine learning models 450 to identify obstructions in a field by inputting the labelled image data into the one or more machine learning models 450.

Image Data Capture

The labels added by the image labelling module 410 to image data may describe a location. The location is where an obstruction was, will be, or is. In the examples above, the farming machine was accomplishing one or more farming objectives in a farming environment. The examples above serve as a basis of techniques for using prescribed actions to captured image data and training a model to detect obstructions in a farming environment based on the image data. This basis may be used for applying the techniques in other contexts, such as for detecting obstructions in a construction environment. In the examples described below, a construction machine is performing one or more construction objectives in a construction environment. The construction machine may use the same or a similar control system to the control system 130 described above.

As described above, other machines may be used to observe prescribed actions in environments. For example, a construction machine may be employed to observe prescribed actions and identify obstructions in a construction environment.

Figure 8:
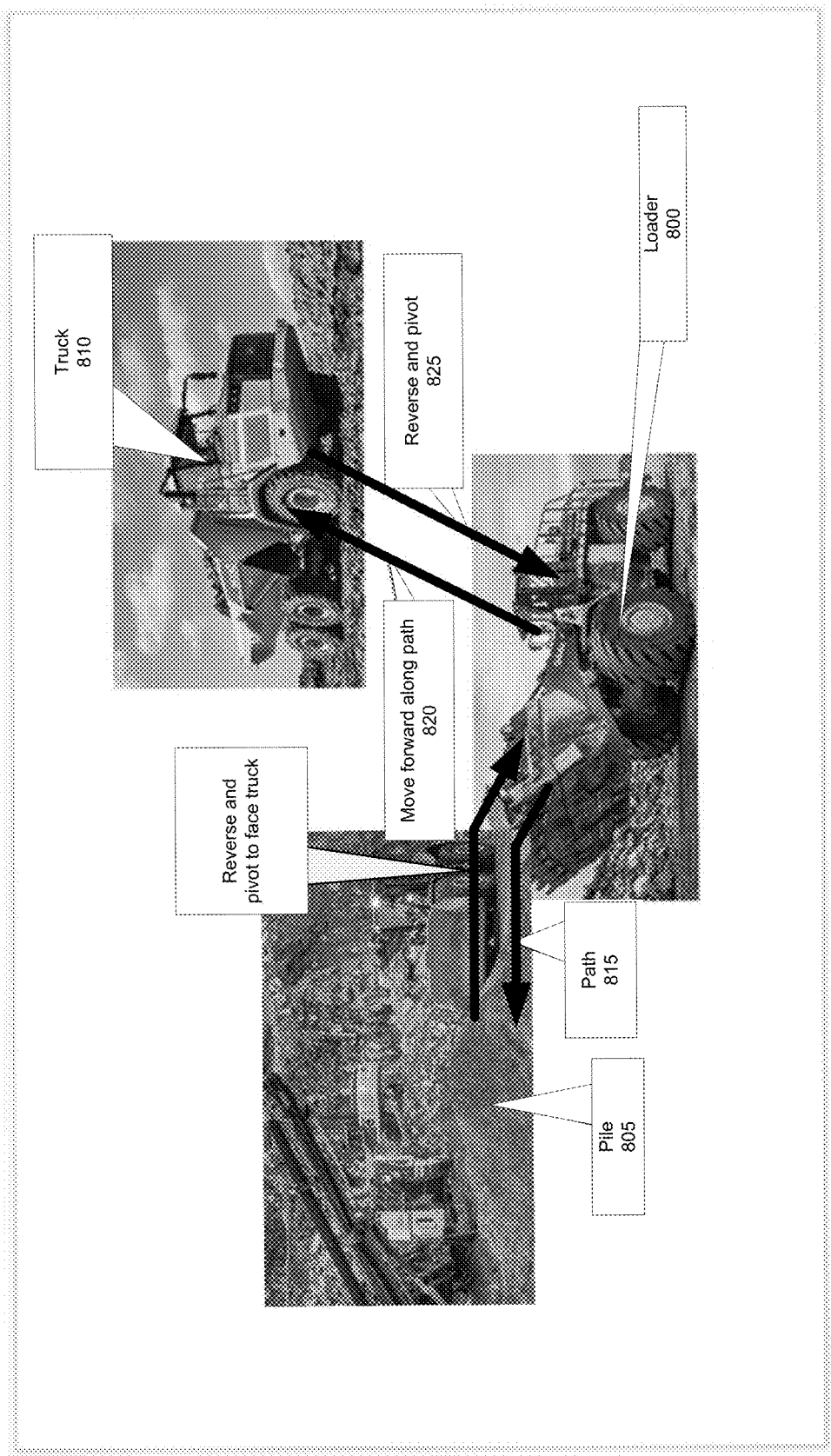
FIG. 8 illustrates an example of a construction machine in a construction environment, in accordance with an example embodiment.

FIG. 8 shows an example of a construction machine in a construction environment, according to one embodiment. In particular, FIG. 8 shows a typical use case for a loader 800, which is a type of construction machine, but other construction machines may also be used. The loader 800a is engaged in moving material from a pile 805 to a truck 810. One or more loaders 800 may be used at the same time in such an operation. Similarly, these loaders 800 may be pulling material from one or more distinct piles and putting that material into one or more trucks 810.

To fill the truck 810, the loader 800 starts by moving 820 forward along a path 815 to pick up the load and, once at the pile 805, digs into the pile 805 to fill its bucket with material. Then, the loader 800 backs away from the pile 805, while turning to face the truck 810. Then the loader 800 drives to the truck 810, raising the bucket and dumping the material into the truck 810. Lastly the loader 800 reverses and pivots 825 to face the pile 805, repeating the process.

The loader 800 may encounter obstructions during any of these job execution steps or before or after the completion of a job, in between jobs, or in other scenarios. Example obstructions may include other workers, either on-foot or in vehicles, and other construction vehicles, such as trucks 810.

The loader 800 or the truck 810 may employ the control system 130 to identify and avoid obstructions in a construction environment. For instance, the loader 800 may use one or more on-board sensors to capture image data of prescribed actions being performed by actors in the construction environment, such as a person taking off their hard hat, a person flagging another construction machine, or the like. The training module 420 may train a machine learning model 450 on the image data labeled based on the prescribed actions. The loader 800 may employ the machine learning model 450 to detect obstructions in real-time via the obstruction identification module 370.

For example, the loader 800 may capture image data of a construction worker kneeling in a construction environment. After the image data has been labeled to indicate that it shows an obstruction at the location of the construction worker kneeling, the training module 420 trains the machine learning model on the image data. Once employed, if the loader 800 encounters a construction worker kneeling in a construction environment, the control system 130 of the loader 800 may flag that there is an obstruction nearby and sound an alarm, change directions, or take another action to avoid the construction worker.

VII. Computer System

Figure 9:
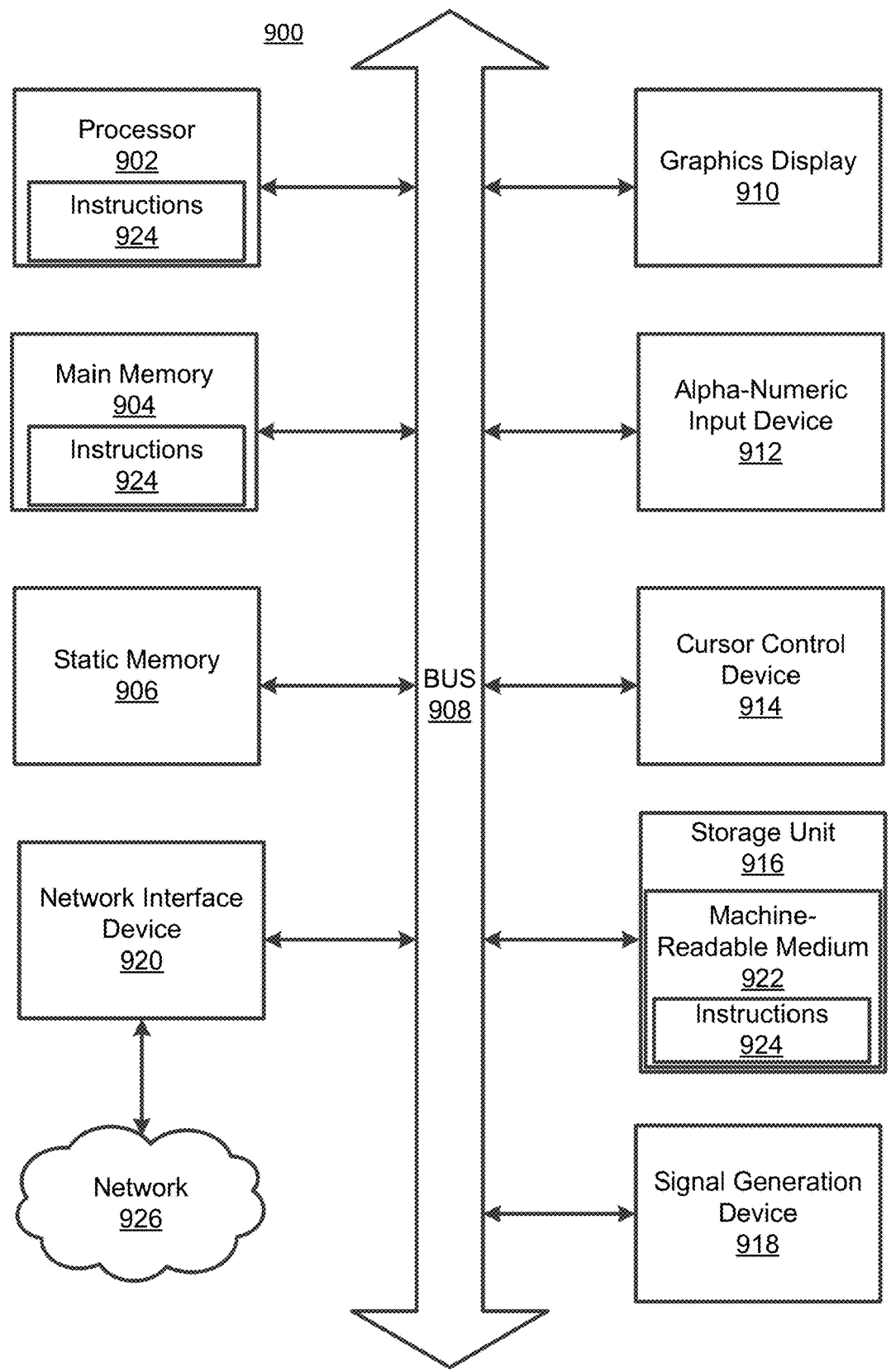
FIG. 9 is a block diagram illustrating components of an example machine for reading and executing instructions from a machine-readable medium, in accordance with an example embodiment.

FIG. 9 is a block diagram illustrating components of an example machine for reading and executing instructions from a machine-readable medium, in accordance with an example embodiment. Specifically, FIG. 9 shows a diagrammatic representation of control system 130 in the example form of a computer system 900. The computer system 900 can be used to execute instructions 924 (e.g., program code or software) for causing the machine to perform any one or more of the methodologies (or processes) described herein. In alternative embodiments, the machine operates as a standalone device or a connected (e.g., networked) device that connects to other machines. In a networked deployment, the machine may operate in the capacity of a server machine or a client machine in a server-client network environment, or as a peer machine in a peer-to-peer (or distributed) network environment.

The machine may be a server computer, a client computer, a personal computer (PC), a tablet PC, a set-top box (STB), a smartphone, an internet of things (IoT) appliance, a network router, switch or bridge, or any machine capable of executing instructions 924 (sequential or otherwise) that specify actions to be taken by that machine. Further, while only a single machine is illustrated, the term "machine" shall also be taken to include any collection of machines that individually or jointly execute instructions 924 to perform any one or more of the methodologies discussed herein.

The example computer system 900 includes one or more processing units (generally processor 902). The processor 902 is, for example, a central processing unit (CPU), a graphics processing unit (GPU), a digital signal processor (DSP), a control system, a state machine, one or more application specific integrated circuits (ASICs), one or more radio-frequency integrated circuits (RFICs), or any combination of these. The computer system 900 also includes a main memory 904. The computer system may include a storage unit 916. The processor 902, memory 904, and the storage unit 916 communicate via a bus 908.

In addition, the computer system 900 can include a static memory 906, a graphics display 910 (e.g., to drive a plasma display panel (PDP), a liquid crystal display (LCD), or a projector). The computer system 900 may also include alphanumeric input device 912 (e.g., a keyboard), a cursor control device 914 (e.g., a mouse, a trackball, a joystick, a motion sensor, or other pointing instrument), a signal generation device 918 (e.g., a speaker), and a network interface device 920, which also are configured to communicate via the bus 908.

The storage unit 916 includes a machine-readable medium 922 on which is stored instructions 924 (e.g., software) embodying any one or more of the methodologies or functions described herein. For example, the instructions 924 may include the functionalities of modules of the system 130 described in FIG. 2. The instructions 924 may also reside, completely or at least partially, within the main memory 804 or within the processor 902 (e.g., within a processor's cache memory) during execution thereof by the computer system 900, the main memory 904 and the processor 902 also constituting machine-readable media. The instructions 924 may be transmitted or received over a network 926 via the network interface device 920.

VIII. Additional Considerations

In the description above, for purposes of explanation, numerous specific details are set forth in order to provide a thorough understanding of the illustrated system and its operations. It will be apparent, however, to one skilled in the art that the system can be operated without these specific details. In other instances, structures and devices are shown in block diagram form in order to avoid obscuring the system.

Reference in the specification to "one embodiment" or "an embodiment" means that a particular feature, structure, or characteristic described in connection with the embodiment is included in at least one embodiment of the system. The appearances of the phrase "in one embodiment" in various places in the specification are not necessarily all referring to the same embodiment.

Some portions of the detailed descriptions are presented in terms of algorithms or models and symbolic representations of operations on data bits within a computer memory. An algorithm is here, and generally, conceived to be steps leading to a desired result. The steps are those requiring physical transformations or manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Some of the operations described herein are performed by a computer physically mounted within a machine 100. This computer may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of non-transitory computer readable storage medium suitable for storing electronic instructions.

The figures and the description above relate to various embodiments by way of illustration only. It should be noted that from the following discussion, alternative embodiments of the structures and methods disclosed herein will be readily recognized as viable alternatives that may be employed without departing from the principles of what is claimed.

One or more embodiments have been described above, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

Some embodiments may be described using the expression "coupled" and "connected" along with their derivatives. It should be understood that these terms are not intended as synonyms for each other. For example, some embodiments may be described using the term "connected" to indicate that two or more elements are in direct physical or electrical contact with each other. In another example, some embodiments may be described using the term "coupled" to indicate that two or more elements are in direct physical or electrical contact. The term "coupled," however, may also mean that two or more elements are not in direct physical or electrical contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article or apparatus that comprises a list of elements is not necessarily limited to only those elements but may include other elements not expressly listed or inherent to such process, method, article or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B is true (or present).

In addition, use of the "a" or "an" are employed to describe elements and components of the embodiments herein. This is done merely for convenience and to give a general sense of the system. This description should be read to include one or at least one and the singular also includes the plural unless it is obvious that it is meant otherwise.

Upon reading this disclosure, those of skill in the art will appreciate still additional alternative structural and functional designs for a system and a process for identifying and treating plants with a farming machine including a control system executing a semantic segmentation model. Thus, while particular embodiments and applications have been illustrated and described, it is to be understood that the disclosed embodiments are not limited to the precise construction and components disclosed herein. Various modifications, changes and variations, which will be apparent to those, skilled in the art, may be made in the arrangement, operation and details of the method and apparatus disclosed herein without departing from the spirit and scope defined in the appended claims.

What is claimed is:

1. A method for achieving a farming objective, the method comprising:
   accessing, an obstruction model configured to identify obstructions in a field from image data of the field, the obstruction model generated by:
   accessing image data of obstructions in a training field, each obstruction in the training field corresponding to a prescribed action occurring at a prescribed time;

labelling the image data of the obstructions in the training field, each obstruction in the image data of the obstructions in the training field labelled based on the prescribed time that the corresponding prescribed action occurred; and training the obstruction model to identify the obstructions in the field using the labelled image data;

capturing the image data of the field including an obstruction in the field;

inputting the image data of the field into the obstruction model to identify the obstruction in the field; and responsive to identifying the obstruction in the field, modifying treatment instructions executed by a farming machine for implementing the farming objective, execution of the modified treatment instructions causing the farming machine to avoid the obstruction in the field.

2. The method of claim 1, further comprising:

sending a message to a mobile device of an actor, the message indicating a first prescribed action for the actor to perform in a field;

capturing image data of the actor performing the first prescribed action;

labelling the image data of the actor with the message; and training the obstruction model on the labeled image data of the actor.

3. The method of claim 1, wherein the prescribed actions simulate obstructions that may occur in the field and include one or more of crouching, lying down, walking, running, making a hand gesture, using an object, looking in a direction, moving an object, or wearing an item.

4. The method of claim 1, wherein the obstruction model is a machine learning model and identifying the obstruction in the field comprises:

receiving input image data as input to the obstruction model; and outputting a confidence score indicating a likelihood that an obstruction is present in the input image data.

5. The method of claim 1, wherein the obstruction model comprises one or more machine learning models and inputting the image data of the field into the obstruction model further comprises:

inputting the image data of the field into the one or more machine learning models to identify obstructions; and identifying the obstruction in the field based on outputs from the one or more machine learning models.

6. The method of claim 5, wherein the one or more machine learning models are one or more of a pixel model, point cloud model, or a bounding box model.

7. The method of claim 1, further comprising:

capturing image data of obstructions in the field where the farming machine implements farming objectives in the field; and wherein the accessed image data is the captured image data.

8. The method of claim 1, wherein the modified treatment instructions cause the farming machine to stop moving, send a notification to an external operator to get instructions based on the obstruction in the field, and proceed according to instructions from the external operator.

9. A non-transitory computer-readable storage medium storing instructions that when executed by a processor cause the processor to perform a method comprising:

accessing, an obstruction model configured to identify obstructions in a field from image data of the field, the obstruction model generated by:

accessing image data of obstructions in a training field, each obstruction in the training field corresponding to a prescribed action occurring at a prescribed time;

labelling the image data of the obstructions in the training field, each obstruction in the image data of the obstructions in the training field labelled based on the prescribed time that the corresponding prescribed action occurred; and training the obstruction model to identify the obstructions in the field using the labelled image data;

capturing the image data of the field including an obstruction in the field;

inputting the image data of the field into the obstruction model to identify the obstruction in the field; and responsive to identifying the obstruction in the field, modifying treatment instructions executed by a farming machine for implementing a farming objective, execution of the modified treatment instructions causing the farming machine to avoid the obstruction in the field.

10. The non-transitory computer-readable storage medium of claim 9, wherein the instructions when executed by the processor further cause the processor to perform the method comprising:

sending a message to a mobile device of an actor, the message indicating a first prescribed action for the actor to perform in a field;

capturing image data of the actor performing the first prescribed action;

labelling the image data of the actor with the message; and training the obstruction model on the labeled image data of the actor.

11. The non-transitory computer-readable storage medium of claim 9, wherein the prescribed actions simulate obstructions that may occur in the field and include one or more of crouching, lying down, walking, running, making a hand gesture, using an object, looking in a direction, moving an object, or wearing an item.

12. The non-transitory computer-readable storage medium of claim 9, wherein the obstruction model is a machine learning model and identifying the obstruction in the field comprises:

receiving input image data as input to the obstruction model; and outputting a confidence score indicating a likelihood that an obstruction is present in the input image data.

13. The non-transitory computer-readable storage medium of claim 9, wherein the obstruction model comprises one or more machine learning models and inputting the image data of the field into the obstruction model comprises:

inputting the image data of the field into the one or more machine learning models to identify obstructions; and identifying the obstruction in the field based on outputs from the one or more machine learning models.

14. The non-transitory computer-readable storage medium of claim 13, wherein the one or more machine learning models are one or more of a pixel model, point cloud model, or a bounding box model.

15. The non-transitory computer-readable storage medium of claim 9, wherein the instructions when executed by the processor further cause the processor to perform the method comprising:

capturing image data of obstructions in the field where the farming machine implements farming objectives in the field; and wherein the accessed image data is the captured image data.

16. The non-transitory computer-readable storage medium of claim 9, wherein the modified treatment instructions cause the farming machine to stop moving, send a notification to an external operator to get instructions based on the obstruction in the field, and proceed according to instructions from the external operator.

17. A computer system comprising:
a processor; and
a non-transitory computer-readable storage medium storing instructions that when executed cause the processor to perform actions comprising:
   accessing, an obstruction model configured to identify obstructions in a field from image data of the field, the obstruction model generated by:
      accessing image data of obstructions in a training field, wherein each obstruction in the training field corresponds to a prescribed action occurring at a prescribed time;
      labelling the image data of the obstructions in the training field, each obstruction in the image data of the obstructions in the training field labelled based on the prescribed time that the corresponding prescribed action occurred; and
      training the obstruction model to identify the obstructions in the field using the labelled image data;
   capturing the image data of the field including an obstruction in the field;
   inputting the image data of the field into the obstruction model to identify the obstruction in the field; and
   responsive to identifying the obstruction in the field, modifying treatment instructions executed by a farming machine for implementing a farming objective, execution of the modified treatment instructions causing the farming machine to avoid the obstruction in the field.

18. The computer system of claim 17, the actions further comprising:
   sending a message to a mobile device of an actor, the message indicating a first prescribed action for the actor to perform in a field;
   capturing image data of the actor performing the first prescribed action;
   labelling the image data of the actor with the message; and
   training the obstruction model on the labeled image data of the actor.

19. The computer system of claim 17, wherein the prescribed actions simulate obstructions that may occur in the field and include one or more of crouching, lying down, walking, running, making a hand gesture, using an object, looking in a direction, moving an object, or wearing an item.

20. The computer system of claim 17, wherein the obstruction model is a machine learning model and identifying the obstruction in the field comprises:
   receiving input image data as input to the obstruction model; and
   outputting a confidence score indicating a likelihood that an obstruction is present in the input image data.

* * * * *